US010095594B2

(12) United States Patent
Vanderah et al.

(10) Patent No.: US 10,095,594 B2
(45) Date of Patent: Oct. 9, 2018

(54) METHODS AND APPARATUS TO IMPLEMENT COMMUNICATIONS VIA A REMOTE TERMINAL UNIT

(71) Applicant: Bristol, Inc., Houston, TX (US)

(72) Inventors: Richard Joseph Vanderah, Marshalltown, IA (US); Robert John Findley, Seymour, CT (US)

(73) Assignee: BRISTOL, INC., Houston, TX (US)

( * ) Notice: Subject to any disclaimer, the term of this patent is extended or adjusted under 35 U.S.C. 154(b) by 135 days.

(21) Appl. No.: 15/168,461

(22) Filed: May 31, 2016

(65) Prior Publication Data

US 2017/0344445 A1    Nov. 30, 2017

(51) Int. Cl.
| | |
|---|---|
| *G06F 11/00* | (2006.01) |
| *G06F 11/20* | (2006.01) |
| *G06F 1/32* | (2006.01) |
| *G06F 13/364* | (2006.01) |
| *G06F 13/40* | (2006.01) |
| *G06F 13/42* | (2006.01) |
| *G05B 19/00* | (2006.01) |

(52) U.S. Cl.
CPC .......... *G06F 11/2041* (2013.01); *G05B 19/00* (2013.01); *G06F 1/3287* (2013.01); *G06F 11/2033* (2013.01); *G06F 13/364* (2013.01); *G06F 13/409* (2013.01); *G06F 13/4068* (2013.01); *G06F 13/4282* (2013.01)

(58) Field of Classification Search
CPC .................................................. G06F 11/2041
See application file for complete search history.

(56) References Cited

U.S. PATENT DOCUMENTS

| | | | | |
|---|---|---|---|---|
| 4,695,946 A | * | 9/1987 | Andreasen | G06F 11/00 714/31 |
| 4,707,834 A | * | 11/1987 | Frisch | G01R 31/31907 324/73.1 |

(Continued)

OTHER PUBLICATIONS

United States Patent and Trademark Office, "Non-Final Office Action," issued in connection with U.S. Appl. No. 15/168,827, dated Mar. 12, 2018, 25 pages.

*Primary Examiner* — Christopher S McCarthy
(74) *Attorney, Agent, or Firm* — Hanley, Flight & Zimmerman, LLC

(57) ABSTRACT

Methods and apparatus to implement communications via a remote terminal unit are disclosed. An example apparatus includes a first central processing unit module to be in communication with a host of a process control system. The example apparatus also includes a first rack including a backplane and a plurality of slots. The plurality of slots includes a master slot to receive the first central processing unit module. The backplane communicatively couples the first central processing unit module to at least one of a first communication module or a first input/output (I/O) module inserted in a second one of the slots. The backplane includes a first communication bus for communication of I/O data and a second communication bus for communication of at least one of maintenance data, pass-through data, product information data, archival data, diagnostic data, or setup data. The first communication bus is independent of the second communication bus.

20 Claims, 13 Drawing Sheets

(56) References Cited

U.S. PATENT DOCUMENTS

| | | | | |
|---|---|---|---|---|
| 5,005,152 A * | 4/1991 | Knutsen | G06F 8/53 | 700/18 |
| 5,038,317 A * | 8/1991 | Callan | G05B 19/054 | 700/24 |
| 5,497,379 A * | 3/1996 | Whetsel | G01R 31/31855 | 324/762.02 |
| 5,659,748 A * | 8/1997 | Kennedy | G06F 9/4405 | 713/2 |
| 6,438,625 B1 * | 8/2002 | Olson | G06F 13/409 | 361/788 |
| 6,662,254 B1 * | 12/2003 | Tal | G06F 13/4045 | 710/2 |
| 6,757,774 B1 * | 6/2004 | Benson | G06F 1/263 | 361/695 |
| 7,043,586 B2 * | 5/2006 | Benson | G06F 13/409 | 710/104 |
| 7,102,893 B1 * | 9/2006 | MacArthur | G02B 6/4452 | 361/788 |
| 7,299,312 B2 * | 11/2007 | McKeown | G06F 13/4068 | 361/760 |
| 7,606,245 B2 * | 10/2009 | Ma | H04L 45/583 | 370/352 |
| 7,835,265 B2 * | 11/2010 | Wang | H04L 41/0663 | 370/216 |
| 8,681,505 B2 * | 3/2014 | Reimund | H05K 7/1435 | 361/729 |
| 8,938,566 B2 * | 1/2015 | Dhandapani | G06F 3/0604 | 710/300 |
| 9,124,446 B2 | 9/2015 | Vanderah | | |
| 9,214,935 B2 * | 12/2015 | O'Connell | H03K 17/6874 | |
| 9,338,919 B2 * | 5/2016 | Kretschmann | G05B 19/058 | |
| 9,423,822 B1 | 8/2016 | Singh et al. | | |
| 9,507,744 B2 * | 11/2016 | Dhandapani | G06F 13/4054 | |
| 9,591,784 B2 * | 3/2017 | Butterbaugh | H05K 7/1488 | |
| 9,750,153 B2 * | 8/2017 | Huang | H05K 7/1422 | |
| 2007/0217169 A1 | 9/2007 | Yeap et al. | | |
| 2011/0266933 A1 | 11/2011 | Hanna | | |
| 2012/0026674 A1 | 2/2012 | Aldridge | | |
| 2017/0344445 A1 | 11/2017 | Vanderah et al. | | |
| 2017/0344451 A1 | 11/2017 | Vanderah et al. | | |

* cited by examiner

| | | | | | |
|---|---|---|---|---|---|
| 402 Power | V+ | 1 | 2 | V+ | Power+, 9 to 36V |
| | V+ | 3 | 4 | V+ | |
| | V- | 7 | 8 | V- | Power- |
| | V- | 9 | 10 | V- | |
| 404 Signal | I/O Tx+ | 1 | 2 | I/O Tx- | I/O bus – Host Tx, Mod Rx |
| | I/O Rx+ | 3 | 4 | I/O Rx- | I/O bus – Host Rx, Mod Tx |
| | Diag+ | 5 | 6 | Diag- | Information, Setup, Diagnostic (ISD) bus – half duplex |
| | Maint+ | 7 | 8 | Maint- | Maintenance and Pass Through (MPT) bus – half duplex |
| | InterR+ | 9 | 10 | InterR- | Module to Module comms - USB |
| | Comm Tx+ | 11 | 12 | Comm Tx- | Comm channel to CPU – CPU Tx, Mod Rx |
| | Comm Rx+ | 13 | 14 | Comm Rx- | Comm channel to CPU – CPU Tx, Mod Rx |
| | Interrupt | 15 | 16 | A/S | Module insertion interrupt, Active/Standby logic |
| | Rack_1 strap | 17 | 18 | Rack_0 strap | Rack Straps |
| | Rack_2 strap | 19 | 20 | +V | +V output (for backplane resistor pull ups) |
| | Term Blk Enable | 21 | 22 | Common | Terminal Blk Enable, Common for Terminal Block |
| | ID | 23 | 24 | Mod_1 strap | ID from Terminal, Module strap |
| | Mod_0 strap | 25 | 26 | Mod_1 strap | Module straps |
| 406 Terminations | CH1+ | 1 | 2 | CH1- | Channel |
| | CH2+ | 3 | 4 | CH2- | Channel 2 |
| | CH3+ | 5 | 6 | CH3- | Channel 3 |
| | CH4+ | 7 | 8 | CH4- | Channel 4 |
| | CH5+ | 9 | 10 | CH5- | Channel 5 |
| | CH6+ | 11 | 12 | CH6- | Channel 6 |
| | CH7+ | 13 | 14 | CH7- | Channel 7 |
| | CH8+ | 15 | 16 | CH8- | Channel 8 |
| | CH9+ | 17 | 18 | CH9- | Channel 9 |
| | CH10+ | 19 | 20 | CH10- | Channel 10 |
| | MS1 | 21 | 22 | MS2 | Module Specific 1 and 2 |
| | MS3 | 23 | 24 | MS4 | Module Specific 3 and 4 |
| | MS5 | 25 | 26 | MS6 | Module Specific 5 and 6 |
| | Enable | 27 | 28 | ID | Enable and ID |
| | V+ | 29 | 30 | Common | Logic Power and Common |

METHODS AND APPARATUS TO IMPLEMENT COMMUNICATIONS VIA A REMOTE TERMINAL UNIT

RELATED APPLICATION

This patent is related to U.S. patent application Ser. No. 15/168,827, entitled "Methods and Apparatus to Communicatively Couple Field Devices to a Remote Terminal Unit," which was filed on May 31, 2016, and which is hereby incorporated herein by reference in its entirety.

FIELD OF THE DISCLOSURE

This disclosure relates generally to process control systems, and, more particularly, to methods and apparatus to implement communications via a remote terminal unit.

BACKGROUND

Industrial control systems, like those used in the oil and gas production industry, frequently include one or more remote terminal units (RTUs) and/or flow computers as key components in an operating process unit of a control system (e.g., at a wellhead oil production site). RTUs are used to interface a control system host with field devices (e.g., valves, valve positioners, switches, sensors, transmitters, etc.) configured to perform control functions such as opening or closing valves and measuring process parameters. RTUs enable this interface by communicating commands from the host to the field devices and by communicating data sent by the field devices back to the host. Further, RTUs may interact with the field devices independent of the host to, for example, buffer communication data, handle time-dependent tasks, calculate and/or implement control actions, and manage historical/trend data. Such communications may be implemented via any of analog, digital, or combined analog/digital buses using any desired communication media (e.g., hardwired, wireless, etc.) and protocols (e.g., Fieldbus, Profibus®, HART®, etc.). Additionally or alternatively, RTUs may act as standalone devices that implement process control and data archiving independent of commands provided by the host (and/or without connection to the host).

SUMMARY

Methods and apparatus to implement communications via a remote terminal unit are disclosed. An example apparatus includes a first central processing unit module to be in communication with a host of a process control system. The example apparatus also includes a first rack including a backplane and a plurality of slots. The plurality of slots includes a master slot to receive the first central processing unit module. The backplane is to communicatively couple the first central processing unit module to at least one of a first communication module or a first input/output (I/O) module inserted in a second one of the slots. The backplane includes a first communication bus for communication of I/O data and a second communication bus for communication of at least one of maintenance data, pass-through data, product information data, archival data, diagnostic data, or setup data. The first communication bus is to be independent of the second communication bus.

A chassis for a remote terminal unit includes a backplane and a plurality of slots to receive modules corresponding to at least one of a central processing unit module, a communication module, or an input/output (I/O) module. The example chassis further includes a first communication bus on the backplane to communicatively couple different ones of the modules inserted in different ones of the slots. The first communication bus is for communication of I/O data. The example chassis also includes a second communication bus on the backplane to communicatively couple different ones of the modules inserted in different ones of the slots independent of the first communication bus. The second communication bus is for communication of at least one of maintenance data, pass-through data, product information data, archival data, diagnostic data, or setup data.

A rack for a remote terminal unit includes a backplane, a first slot communicatively coupled to the backplane to receive a first module, and a second slot communicatively coupled to the backplane to receive a second module. The first module corresponds to a master central processing unit module for the remote terminal unit. The second module corresponds to at least one of a second central processing unit module, a communication module, or an input/output (I/O) module. The example rack further includes a first communication bus on the backplane to communicatively couple the first and second modules when inserted in the first and second slots. The first communication bus is to be implemented for communication of I/O data. The example rack also includes a second communication bus on the backplane to communicatively couple the first and second modules independent of the first communication bus. The second communication bus is to be implemented for communication of additional data other than the I/O data.

BRIEF DESCRIPTION OF THE DRAWINGS

FIG. 4 illustrates a schematic of an example pin connector arrangement for each of the slots of the example rack of FIG. 2.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
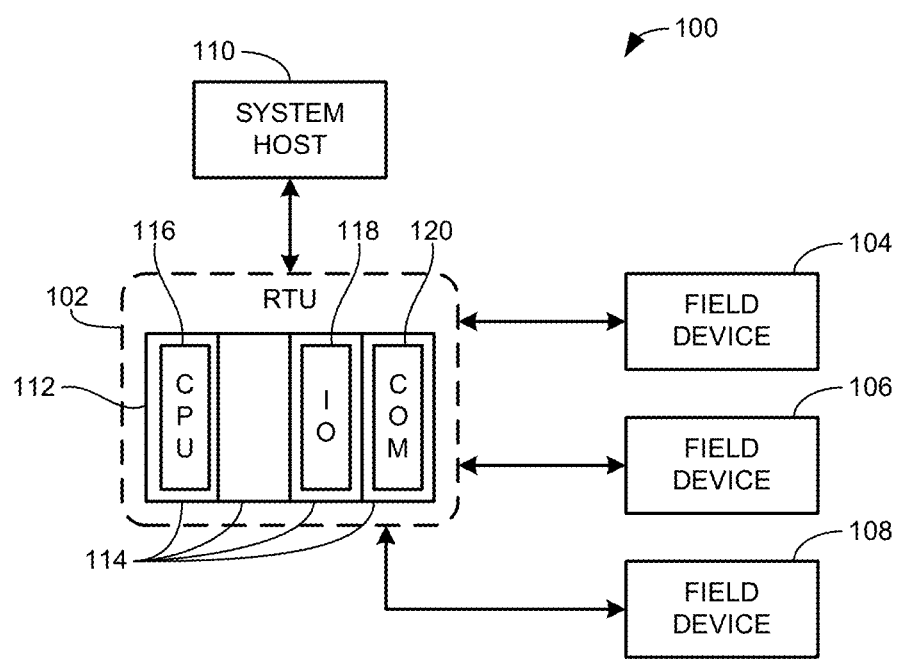
FIG. 1 illustrates a portion of an example control system within which the teachings of this disclosure may be implemented.

Remote terminal units (RTUs) and/or flow computers enable the communication of data between field devices and/or other components and a supervisory control and data acquisition (SCADA) system, a distributed control system (DCS), or any other control system. For convenience of explanation, as used herein, an RTU refers to either an RTU or a flow computer. Further, as used herein, a SCADA system, a DCS, or a process control system are used interchangeably to refer to any type of control system. In a process control system, an operator and/or other personnel may monitor and/or control various operating process units and/or other aspects of the control system via a central host. To enable an operator to monitor and/or control a control system in this manner involves the communication of data between the host and the process units and/or the other aspects of the control system.

Often, RTUs include a backplane to communicatively interconnect a local processor with one or more communication and/or I/O cards or modules that are, in turn, communicatively coupled to one or more field devices and/or other components. Various types of data may be communicated between the modules and the local processor including, for example, input/output (I/O) data, maintenance data, configuration or setup data, diagnostic data, product information data, and archival data. In the past, these different types of data have been communicated between the modules and the local processor over a single bus on the backplane. Additionally, in more recent years, tools have been developed (e.g., asset management software (AMS)) that operate at the host end of a control system but can communicate directly with modules and/or smart field devices (e.g., containing diagnostics and/or additional process related information) by passing through the local processor of the RTU. While such communications may bypass the local processor, they are typically also transmitted over the backplane bus used for all other communications.

Among the different types of data that may be communicated over an RTU communication bus, I/O data is often the most time-dependent critical because real-time or substantially real-time data (e.g., updated approximately every one second or less) can impact the reliability of process control conditions. Furthermore, up-to-date I/O data can be critical to the accuracy of rate calculations and/or flow calculations (e.g., when the RTU is operating as or in connection with a flow computer). However, with all the other types of data that may also need to be communicated, there is the possibility that I/O scanning is interrupted and/or delayed at certain points in time, thereby turning a deterministic system into an non-deterministic system because the scheduling of real-time or substantially real-time updates cannot be guaranteed. This problem has become an even greater concern in recent years with the rise of smart modules and digital I/O where more communication bandwidth is needed for diagnostics and serviceability. Furthermore, in connection with maintenance, I/O updates may be effectively shut down during firmware updates.

Examples disclosed herein overcome the above limitations with a chassis or rack that includes a backplane having separate communication buses. In some examples, one bus is dedicated to the communication of I/O data while the other buses are used for the communication of all other types of data. In this manner, I/O scanning and updates can be maintained on a consistent deterministic basis without the concern for interruptions arising when other types of data are communicated to or from modules coupled to the backplane. Thus, in some examples, the loading of the I/O bus can be accurately determined based on the number of modules and the number of process variables per module because other communications are handled on different buses. For instance, in some examples, a second bus is provided for maintenance related communications (e.g., firmware updates) and/or pass-through data (e.g., communications from a central host directly to a specific I/O module). Additionally or alternatively, in some examples, a third bus is provided for configuration and/or diagnostics related communications. Not only does separating communications among multiple different buses improve the reliability of I/O updates, the multiple buses substantially increase the overall bandwidth for the system. For example, where three separate communication buses are provided, the overall bandwidth effectively becomes three times greater than if there was only one bus over which all communications were transmitted. As a result, the teachings of this disclosure enable data bursts from either the diagnostics or maintenance buses, thereby allowing data logging functions at the I/O module level. Additionally, the teachings disclosed herein may be implemented to enhance distributed RTU (dRTU) technology to allow for the intermittent transfer of block data in such systems while maintaining deterministic I/O updates.

Furthermore, some example racks disclosed herein include entry and exit connectors to communicatively interconnect multiple racks (each supporting a number of modules) to enable the expansion of the backplane for additional communication and/or I/O modules. In some such examples, the multiple communication buses pass through the entry and exit connectors such that the modules on each interconnected rack may be connected and controlled by a single master local processor (e.g., in a master rack). In some examples, additional processor modules (slave to the master local processor) may be inserted in any of the racks to substantially increase the processing power of the connected system. Furthermore, in accordance with the teachings of this disclosure, through the use of slot and rack strapping, the position of each module in each rack and the position of each rack in a series of interconnected racks can be determined directly and automatically to enable the automatic addressing of each of the modules.

Turning in detail to the drawings, FIG. 1 illustrates a portion of an example control system 100 (e.g., a SCADA system) within which the teachings of this disclosure may be implemented. The example system 100 includes an RTU 102. In the illustrated example, the RTU 102 is in communication with one or more field devices 104, 106, 108. Additionally, as illustrated in FIG. 1, the RTU 102 is also in communication with a system host 110 associated with the example system 100. In the illustrated example, communications between the RTU 102 and the system host 110 may be accomplished via any suitable communications device and/or medium. For example, the RTU 102 may include and/or be coupled to a wireless radio. As used herein, the term radio refers to any of a wireless transmitter or a wireless receiver either separately or in combination.

The example system host 110 of FIG. 1 allows an operator, engineer, and/or other plant personnel (any of which may be referred to herein as a user) to review and/or interact with one or more operator display screens and/or applications that enable the user to view system variables, states, conditions, and/or alarms associated with the example control system 100; change control settings (e.g., set points, operating states, clear alarms, silence alarms, etc.) for the example control system 100; configure and/or calibrate devices within the example control system 100; perform diagnostics of devices within the example control system 100; and/or otherwise interact with devices within the example control system 100.

The example system host 110 of FIG. 1 may be implemented using one or more workstations and/or any other suitable computer systems and/or processing systems. For example, the system host 110 could be implemented using single processor personal computers, single or multi-processor workstations, a portable laptop computer, etc. The host 110 may be configured with one or more application stations to perform one or more information technology applications, user-interactive applications and/or communication applications. For example, an application station may be configured to perform primarily process control-related applications, while another application station may be configured to perform primarily communication applications that enable the control system 100 to communicate with other devices or systems using any desired communication media (e.g., wireless, hardwired, etc.) and protocols (e.g., HTTP, SOAP, etc.).

As shown in the illustrated example of FIG. 1, the RTU 102 includes at least one rack or chassis 112 with a plurality of ports, connectors, or slots 114 to hold different types of modules including at least one central processing unit (CPU) module 116 through which the functionality of the RTU 102 is implemented. In some examples, other ones of the slots 114 hold one or more input/output (I/O) modules 118 and/or communications (COM) modules 120 through which the RTU 102 interfaces with other components within the control system 100 (e.g., the field devices 104, 106, 108). In some examples, each of the slots 114 (and the corresponding modules 116, 118, 120 inserted therein) are in communication with one another via a backplane constructed in the rack 112 of the RTU. The backplane of the rack is described in greater detail below in connection with FIG. 3. The CPU module 116 of the RTU 102 may be in communication with the system host 110 via a network communication port and protocol of the example control system 100 (e.g., via a wireless long haul radio, via a cellular network, via a satellite link, etc.).

As shown in the illustrated example, the RTU 102 is communicatively coupled to one or more field devices 104, 106, 108. In some examples, at least some of the example field devices 104, 106, 108 may be smart field devices such as Fieldbus compliant valves, actuators, sensors, etc., in which case the smart field devices 104, 106, 108 communicate with the RTU 102 via one of the I/O modules 118 using the well-known Foundation Fieldbus protocol via any of wired or wireless communications media. Of course, other types of smart field devices and communication protocols could be used instead. For example, the smart field devices 104, 106, 108 could instead be Profibus® and/or HART® compliant devices that communicate with the RTU 102 using the well-known Profibus® and HART® communication protocols. Additionally or alternatively, in some examples, the field devices 104, 106, 108 may be communicatively coupled over a local wireless network in accordance with the WirelessHART™ protocol. In some such examples, the RTU 102 may pass through information and/or data from the system host 110 to a WirelessHART™ interface module to communicate with the local wireless network of field devices. Further, in other examples, at least some of the field devices 104, 106, 108 may be non-smart field devices such as conventional 4-20 milliamp (mA) or 0-24 volts direct current (VDC) devices that communicate with the RTU 102 via a respective hardwired link.

While FIG. 1 illustrates an example process control system 100 within which the RTU 102, described in greater detail below, may be implemented, the methods and apparatus described herein may, if desired, be advantageously employed in other SCADA and/or process control systems of greater or less complexity (e.g., having more than one RTU, having other controllers, having more field devices, etc.) than the illustrated example of FIG. 1.

Figure 2:
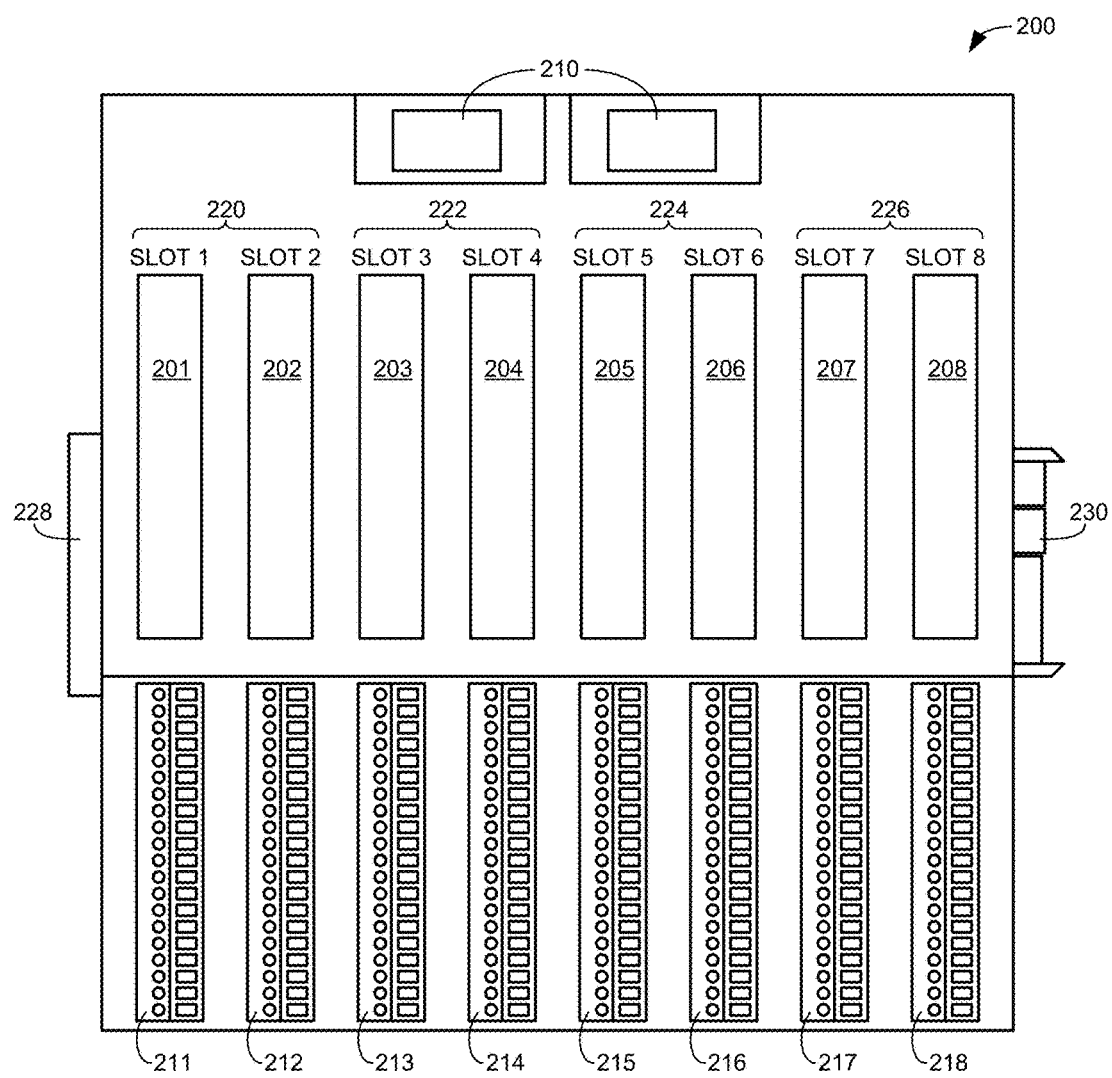
FIG. 2 illustrates an example rack or chassis to implement the example RTU of FIG. 1.

FIG. 2 illustrates an example rack or chassis 200 (similar to the rack 112 of FIG. 1) to implement the example RTU 102 of FIG. 1. In some examples, the rack 200 has no active electronics and may be mounted inside a field enclosure, either directly to a plate or via a DIN rail. As shown in the illustrated example, the rack 200 includes eight slots 201, 202, 203, 204, 205, 206, 207, 208 to receive up to eight modules. Further, the example rack 200 includes two power input connectors 210 that provide power to the modules inserted in the slots 201-208. Also, the example rack 200 of FIG. 2 includes eight termination blocks 211, 212, 213, 214, 215, 216, 217, 218 to be communicatively coupled to modules in corresponding ones of the slots 201-208. In some examples, the termination blocks 211-218 are separate and removable from the rack 200 but are shown coupled to corresponding termination slots similar to the slots 201-208 that are to receive the modules 116, 118, 120.

In some examples, the rack 200 includes a backplane (shown and described in greater detail below in connection with FIG. 3) to enable communications between different modules installed in different ones of the slots 201-208. In some examples, the backplane and associated module connectors are the same for each slot such that any module can be inserted in any slot. In some examples, the functionality of a particular module is determined by its position among the eight slots 201-208. For instance, in some examples, the slots 201-208 are configured into four redundant pairs 220, 222, 224, 226 with odd numbered slots (slot number 1, 3, 8, and 7) being redundant with adjacent even numbered slots (slot numbers 2, 4, 6, and 8). In some examples, the odd numbered slots are the default active slots in the redundant pairs 220, 222, 224, 226 while the even numbered slots are the default standby or backup slots that become active if there is a failure of the module in the corresponding slot. For purposes of this disclosure, the default active slot in a redundant pair of slots is referred to herein as the primary slot whereas the default standby slot in the redundant pair is referred as the secondary slot. Thus, whether a module is inserted into a primary slot or a secondary slot of a redundant pair of slots may define the functionality and/or operational state of the module. For purposes of this disclosure, a module inserted into a primary slot is referred to as the primary module while a redundant module inserted in a secondary slot is referred to as the secondary module. Although the backplane of the rack 200 enables the slots 201-208 to be configured into redundant pairs 220, 222, 224, 226, the slots 201-208 may alternatively be implemented in a non-redundant manner. That is, in some examples, all eight slots 201-208 may include eight different modules that are all active.

Additionally, in some examples, the first one of the slots 201 (slot number 1) is designated as a master slot for the rack 200. In some such examples, the master slot 201 is to receive a CPU module 116 to direct and control the functionality of the RTU 102 and communicate with modules in the other slots 202-208. As indicated above, in some examples, the second one of the slots 202 (slot number 2) may be the secondary or standby slot for the first (or master) redundant pair 220 of slots. Thus, in some examples, the second slot 202 may include a separate CPU module 116 that may be activated in redundant mode if the CPU module 116 in the first slot 201 fails. Alternatively, in some examples, the second slot 202 supports a COM module 120 with a one-to-one communication path to the CPU module 116 inserted in the master slot 201. Further, in some examples, the second slot 202 supports the use of an I/O module 118 (in a non-redundant mode). The remaining slots 203-208 (slot numbers 3-8) similarly support either I/O modules 118 or COM modules 120 configured either as redundant pairs or in a non-redundant configuration. Further, in some examples, a CPU module 116 may also be implemented in any of the slots 203-208 unassociated with the master pair 220. However, in some such examples, the CPU module 116 in slots 203-208 functions similarly to an I/O module 118, for purposes of communications, as a slave to the CPU module 116 in the master slot 201. Accordingly, for purposes of explanation, a CPU module that is in the master slot 201 (slot 202 when in redundant mode) is referred to herein as the master CPU module, while a CPU module 116 that is not in the master slot 201 (or the secondary slot 202 when in redundant mode) is referred to herein as a CPU I/O module because it includes the processing power of a CPU module but functions like an I/O module for purposes of communications on the rack 200.

In addition to communications between modules inserted in the slots 201-208, in some examples, the backplane of the example rack 200 enables communication between the slots 201-208 and the termination blocks 211-218. In this manner, the modules may communicate with field devices (e.g., the field device 104, 106, 108) communicatively coupled to the particular ones of the termination blocks 211-218.

As shown in the illustrated example, the rack 200 includes an entry connector 228 and an exit connector 230 (generally referred to herein as rack-to-rack connectors) that are communicatively interconnected via the backplane of the rack 200. In some examples, the exit connector 230 of a first rack 200 may be interconnected with the entry connector 228 of a second rack 200. That is, in some examples, multiple racks 200 may be coupled in series with their associated backplanes communicatively interconnected, thereby enabling modules on any one of the racks to communicate with each other. As used herein, two or more racks 200 communicatively interconnected via the entry and exit connectors 228, 230 are collectively referred to herein as a panel. In some examples, a single master CPU module controls the operation and functioning of all modules inserted into a panel regardless of the particular rack 200 into which the module is inserted. That is, in some examples, a CPU module 116 installed in the master slot 201 of a rack 200 may nevertheless function as a CPU I/O module that is slave to a master CPU module installed in the master slot 201 of a different rack 200 interconnected with the first rack. In some examples, which CPU module functions as the master CPU module for the entire panel is determined based on the relative placement of the racks interconnected together to form a multi-rack panel as will be explained below in greater detail in connection with FIG. 8.

In some examples, each of the power input connectors 210 includes two positive terminals and two common terminals. In this manner, the power input connectors 210 enable the use of redundant power supplies and the ability for power to be daisy chained for distribution of power to other devices. In some examples, diode steering and polarity protection are provided on the rack (or the power termination block) for the power supply sources.

Figure 3:
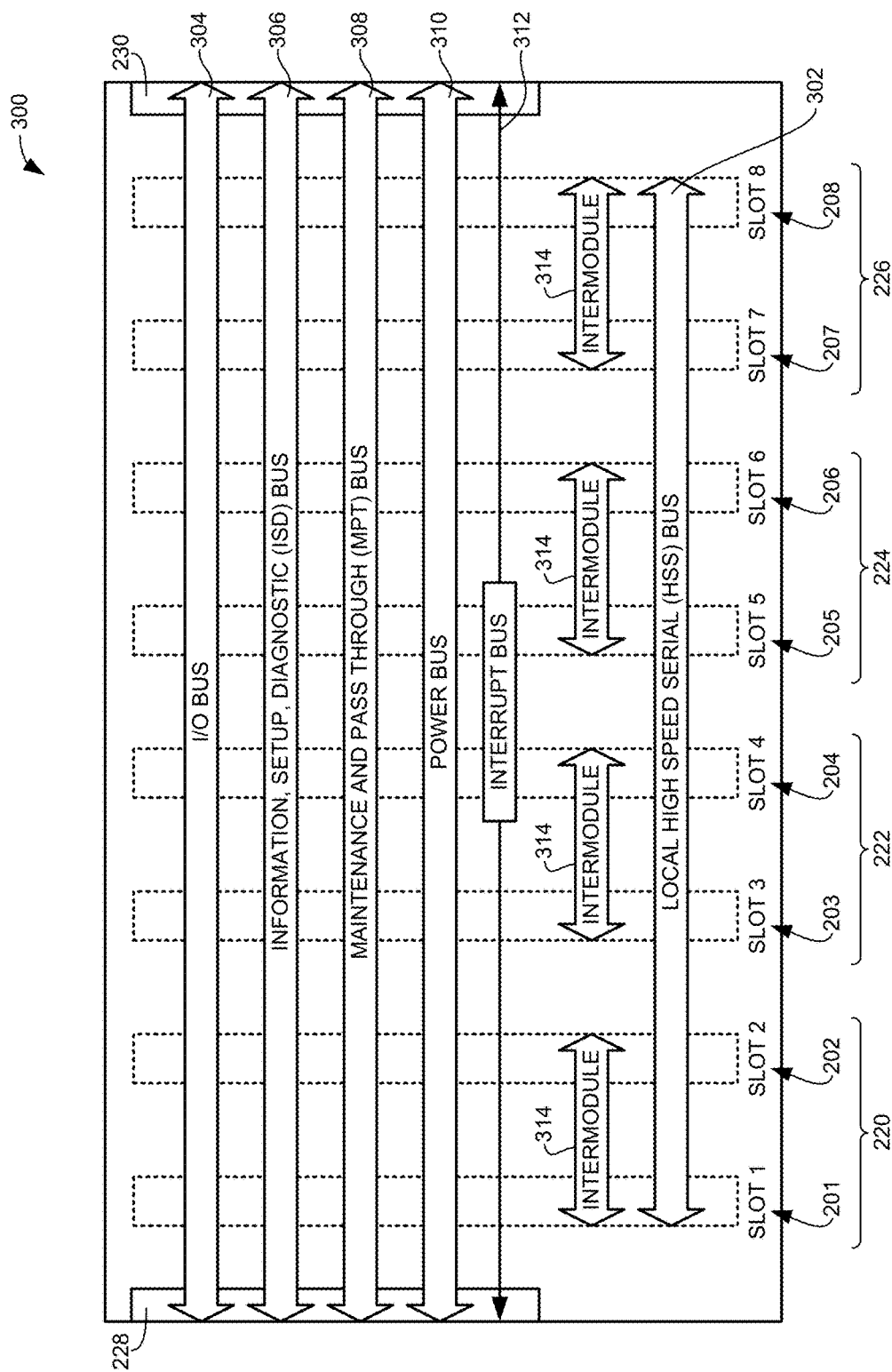
FIG. 3 illustrates a schematic of an example backplane of the example rack of FIG. 2.

FIG. 3 illustrates a schematic of an example backplane 300 communicatively interconnecting each of the slots 201-208 of the example rack 200 of FIG. 2. As shown in FIG. 3, the backplane 300 provides a local high speed serial (HSS) bus 302 that is internal to the rack 200 (i.e., the local HSS bus 302 does not pass through the entry and exit connectors 228, 230 to other connected racks). In some examples, the local HSS bus 302 is a high speed full duplex serial communications bus between each of the slots 201-208 connected on the backplane 300. The local HSS bus 302 provides a dedicated high speed path from a master CPU module (a CPU module 116 inserted in the master slot 201) and all other modules on the rack 200 (including other CPU modules 116 (as CPU I/O modules), I/O modules 118, and/or COM modules 120). The high speed communications made available over the local HSS bus 302 enable the implementation of expanded communication ports and/or the use of serial I/O modules. In some examples, under normal operation (e.g., when there has not been a failover to a secondary module when in redundant mode), the CPU module 116 in the master slot 1 is the master of the local HSS bus 302. In some such examples, the master CPU module requests the status for pending requests through the local HSS bus 302.

In addition to the local HSS bus 302, the example backplane 300 includes three other communication buses including an I/O bus 304, an Information, Setup, and Diagnostic (ISD) bus 306, and a Maintenance and Pass-Through (MPT) bus 308. Unlike the local HSS bus 302, each of the I/O bus 304, the ISD bus 306, and the MPT bus 308 connect with entry and exit connectors 228, 230 such that each of the buses may extend through multiple racks 200 connected in series. Accordingly, the I/O bus 304, the ISD bus 306, and the MPT bus 308 are collectively referred to herein as rack-to-rack communication buses.

In some examples, the I/O bus 304 is used for the transmission of input and output dynamic data referred to herein as I/O data. As used herein, I/O data corresponds to control signals sent to field devices 104, 106, 108 and/or feedback obtained from the field devices 104, 106, 108 associated with the operation and control of the control system 100. The transmission of I/O data is often time-critical with the need for real-time or substantially real-time updates. Accordingly, in some examples, the I/O bus 304 is dedicated exclusively to the transmission of I/O data, while all other types of data transmissions (discussed below) are transmitted using other ones of the buses. This increases the likelihood that there will always be sufficient bandwidth for real-time or substantially real-time I/O data updates. In some examples, the I/O bus 304 may be used to transmit requests for a status from each module rather than, or in addition to, the local HSS 302 as described above.

In some examples, the I/O bus 304 is a high speed (e.g., 4 megabit/second or greater) low-voltage differential signaling (LVDS) bus. In some examples, the I/O bus 304 is used in full duplex mode. In this manner, when the master CPU module is receiving a message from a module, the master CPU module can be writing to another module at the same time. In some examples, this approach may include the implementation of a time division multiple access (TDMA) type architecture to further increase the efficiency of the bus 304. In some examples, while the master CPU module is communicating with a module, any other module on the I/O bus 304 may listen and selectively use the dynamic data without intervention of the master CPU module.

In some examples, a transmission from a module is initiated by a short request from the master CPU module. In some such examples, the particular content of the transmission is determined at startup (or at a configuration change) by using the ISD bus 306 to select the dynamic parameters to be transmitted. The format of the transmission may include a rack address (e.g., corresponding to the position of the rack 200 when multiple racks are connected in series), a module address (e.g., corresponding to the slot position of the module within the rack 200), a module status, an indication of a number of packets being sent, multiple parameter/data packets, and a cyclic redundancy check (CRC). In some examples, each parameter/data packet contains eight bytes including three for parameter identification, one for data type, and four data bytes. As such, a double precision floating point number would need two packets.

In the illustrated example of FIG. 3, the ISD bus 306 is used for the transmission of information that is not time deterministic critical including configuration or setup data, diagnostic data, product information data, archival data, and/or other types of non-real-time data. As used herein, a configuration or setup data corresponds to data associated with the reading and writing of configuration parameters along with setting and/or viewing the assignments for transmissions over the I/O bus 304. As used herein, diagnostic data corresponds to data associated with the viewing of maintenance logs and the retrieval of alarm and/or event information when prompted by the status byte of a transmission over the I/O bus 304. As used herein, product information data corresponds to predefined and/or manufacturing specified data associated with the modules and/or the connected field devices such as, for example, a module type, a part number, a manufacturing date, a version number (e.g., hardware version and/or firmware version), product settings, a function description, etc. As used herein, archival data corresponds to information stored in an internal database of a module including the assignment of parameters and short term historical logs including current status (e.g., module level alarms, communication error rates, loading, etc.).

In some examples, the ISD bus 306 is a high speed (e.g., 4 megabit/second or greater) low-voltage differential signaling (LVDS) bus. In some examples, the ISD bus 306 is a high speed RS485 bus. Inasmuch as the data transmitted over the ISD bus 306 is not time deterministic critical, in some examples, the ISD bus 306 is used in half-duplex mode with transmissions occurring periodically (rather than continuously and/or in substantially real-time). In some examples, the ISD bus 306 is a request/response bus with the request to each module containing the address of the module as determined by the position of the rack (within a series of multiple racks) and the slot position of the module within the corresponding rack.

In the illustrated example of FIG. 3, the MPT bus 308 is used for the transmission of maintenance data corresponding to the transmission of firmware updates and the retrieval of maintenance logs. In some examples, firmware updates are achieved by holding the most current firmware of all module types in the CPU file system. In some examples, module firmware updates may be accomplished as needed without removing the module and without affecting I/O updates rates because they are provided over a separate bus. Furthermore, the illustrated example allows for remote updates and the automatic updating of repair/spare modules inserted to replace previously used modules.

Additionally or alternatively, the MPT bus 308 is used for the transmission of pass-through data corresponding to data passed directly through (e.g., without the intervention of) the master CPU module between the system host 110 and a module in one of the other slots. In this manner, an operator or other personnel remotely located at the system host 110 (or locally connected via a separate CPU) may be able to take advantage of module specific tools including, for example, WirelessHART setup and diagnostic tools, distributed RTU (dRTU) network tools, and/or asset management system (AMS) tools that communicate directly with a particular module. In some examples, the pass-through data may include transmissions of data directly between the system host 110 and a particular field device (e.g., using HART or WirelessHART). In some examples, these pass-through communications may be implemented synchronously with I/O scanning because they are done on separate buses. Additionally or alternatively, the MPT bus 308 may be used for direct communication with network visualization tools to enhance network setup and network monitoring tools.

In some examples, the MPT bus 308 is a high speed (e.g., 4 megabit/second or greater) low-voltage differential signaling (LVDS) bus. In some examples, the MPT bus 308 is a high speed RS485 bus. In some examples, the MPT bus 308 is used in half-duplex mode with transmissions occurring periodically (e.g., as needed rather than continuously and/or in substantially real-time).

One advantage of having separate communication buses, as described above, is that the ISD bus 306 and the MPT bus 308 enable communications without disturbing or otherwise inhibiting scanning of I/O occurring over the I/O bus 304, which are often the most time-dependent critical transmissions. That is, one purpose of the ISD bus 306 and the MPT bus 308 is to keep infrequent traffic off of the I/O bus 304 to ensure adequate bandwidth for increased scan time for I/O updates. Thus, in some examples, the division of the particular types of data transmitted over each of the ISD bus 306 and the MPT bus 308 may be different than as described above. Furthermore, in some examples, there may only be one bus other than the I/O bus 304 that services all communications for both of the ISD bus 306 and the MPT bus 308 described above. In other examples, there may be more than three rack-to-rack communication buses.

In some examples, any one of the rack-to-rack communication buses (e.g., the I/O bus 304, the ISD bus 306, and the MPT bus 308) may serve as a failover bus for one of the other buses. For example, if the ISD bus 306 fails, the MPT bus 308 may take over the communications designated for the ISD bus under normal operations. Similarly, if the I/O bus 304 fails, the ISD bus 306 and/or the MPT bus 308 may be used to transmit I/O data normally communicated over the I/O bus 304. Likewise, although the I/O bus 304 is intended to be dedicated exclusively to the transmission of I/O data, in some examples, the I/O bus 304 may transmit information unrelated to I/O updates as the need arises.

As shown in the illustrated example of FIG. 3, in addition to the various communications buses (e.g., the local HSS bus 302, the I/O bus 304, the ISD bus 306, and the MPT bus 308), the backplane 300 includes a power bus 310 to distribute input power (from the power input connectors 210 of FIG. 2) to the modules inserted in each slot 201-208. In some examples, the input power ranges between approximately 9 volts DC to 36 volts DC. In some examples, the backplane 300 includes multiple positive and common pin connectors at each slot to handle fault currents and/or to reduce the impedance of the connection. In some examples, the connectors at each slot 201-208 and/or the corresponding connectors on the modules to be inserted therein are configured to establish a power connection before establishing a signal connection (e.g., based on different pin lengths) to enable hot insertion of a module. In connection therewith, as shown in FIG. 3, the example backplane 300 includes an interrupt bus 312, which is a one signal bus that provides a signal (an interrupt) to the master CPU module 116 when a module is inserted under power. Additionally or alternatively, in some examples, an interrupt signal is also generated and transmitted via the interrupt bus 312 when a module is removed from a slot under power. In some examples, the interrupt for removal is triggered based on a mechanical latch on the module that a user depresses before removing the module. As shown in the illustrated example, the interrupt bus 312 extends across the entry and exit connectors 228, 230 of the rack 200 such that the interrupt signal can be communicated to a master CPU module on a different rack 200 than the rack where the module is being installed.

In some examples, the backplane 300 enables module-to-module communications between redundant modules installed in the redundant pairs 220, 222, 224, 226 of the slots 201-208 over an intermodule link 314. In some examples, such communications include a status signal indicative of whether the module in the primary slot (the odd numbered slot in the illustrated example) or the secondary slot (the even numbered slot) has control (e.g., is active). In some examples, a value of "1" on the status line indicates the primary module has control and a value of "0" indicates the secondary module has control. Additionally or alternatively, in some examples, the intermodule link 314 of the backplane 300 is implemented as a universal serial bus (USB) link that enables the synchronization of redundant modules to be maintained. That is, in some examples, the dynamic variables and database of the modules are synced using the USB link. Further, in some examples, the USB link is used to compare I/O values of the redundant pair of modules in substantially real-time to detect and/or warn of deviations. Further still, the secondary module (e.g., the backup module in the secondary slot) may use the USB link to monitor the primary module to determine whether the primary module has failed and switchover needs to occur.

Although not represented in FIG. 3, in some examples, the backplane 300 also enables communications between the slots 201-208 that hold modules and corresponding termination slots to which the termination blocks 211-218 may be coupled.

FIG. 4 illustrates a schematic of an example pin connector arrangement associated with a slot 400 on the example rack 200 of FIG. 2. In some examples, the slot 400 is representative of the pin connector arrangement for each of the slots 201-208 of the rack 200 of FIG. 2. That is, in some examples, the pin connector arrangement of each slot on a rack 200 is configured identically to every other slot such that any module can be inserted into any slot. As shown in the illustrated example, the slot 400 includes power connectors 402, signal connectors 404, and termination connectors 406. The power connectors 402 electrically couple an inserted module to the power bus 310 of the backplane 300, which is electrically coupled to the power input connectors 210 that provide power to the rack 200. The signal connectors 404 include an interface between an inserted module and the local HSS bus 302, the rack-to-rack communication buses 304, 306, 308, the interrupt bus 312, as well as the intermodule link 314 between redundant pairs of slots. Additionally, the signal connectors 404 include pin connectors for slot and rack strapping so that an inserted module can automatically determine its position on a rack and the placement of the rack within a multi-rack panel as is described in greater detail below in connection with FIGS. 10 and 11. The termination connectors 406 communicatively couple an inserted module with a corresponding one of the termination blocks 211-218 to communicate with associated field devices wired thereto.

Figure 5:
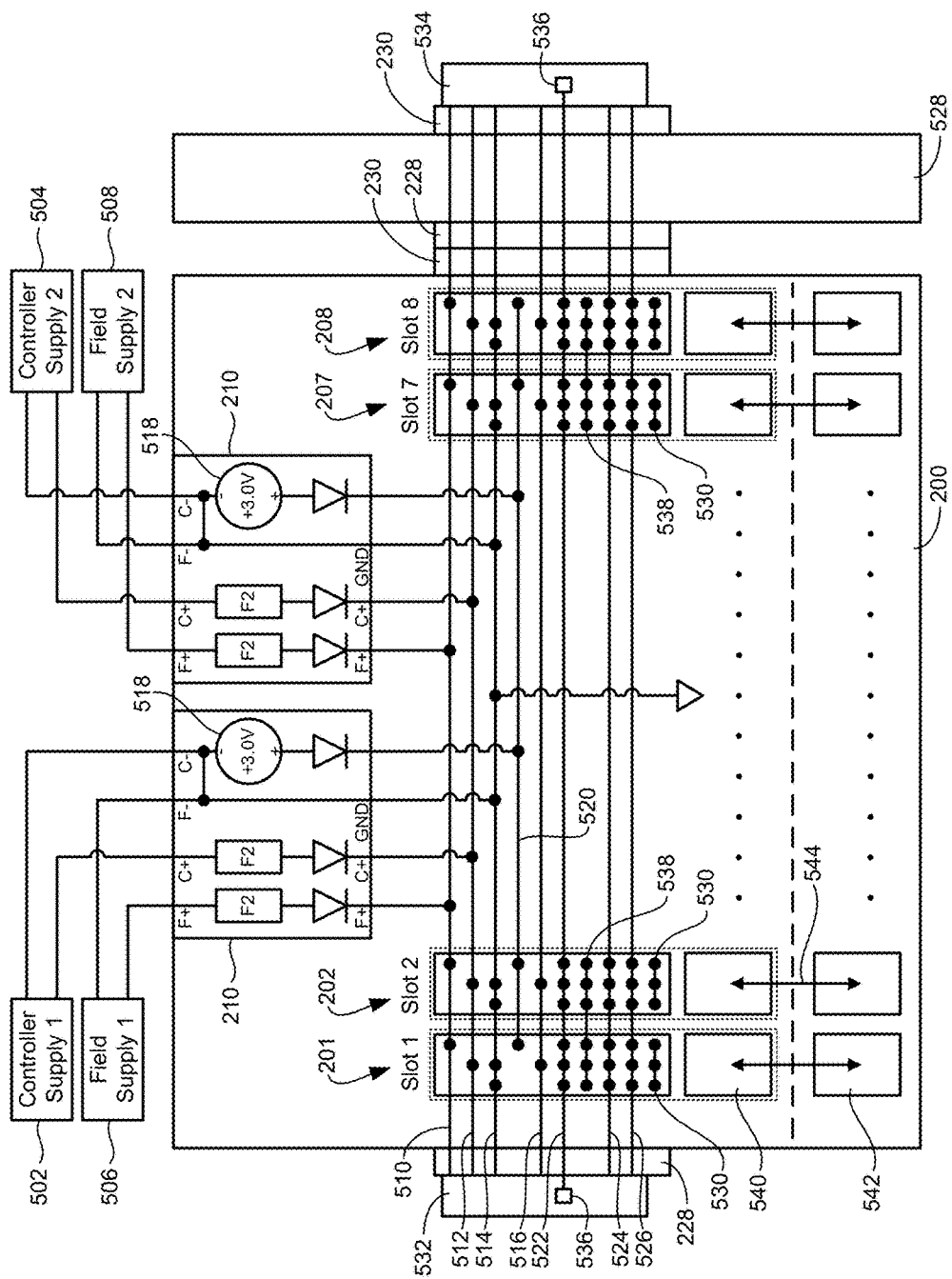
FIG. 5 illustrates a schematic of example signal paths between pin connectors of the slots within the example rack of FIG. 2.

FIG. 5 illustrates a schematic of example signal paths between pin connectors of different slots within the example rack 200 of FIG. 2 when coupled to redundant controller power supplies 502, 504 and redundant field power supplies 506, 508. In some examples, the first controller and field power supplies 502, 506 are electrically coupled to a first one of the power input connectors 210 of the rack 200 while the second controller and field power supplies 504, 508 are electrically coupled to the second one of the power input connectors 210. Redundancy between the first and second controller power supplies 502, 504 is accomplished through a diode-OR logical circuit implementation as illustrated in FIG. 5 such that the controller power supply with a higher voltage potential will be the primary or active power source. If the primary power supply fails such that the voltage potential drops below the potential provided by the other power supply, the other power supply will automatically become active. Similarly, redundancy between the first and second field power supplies 506, 508 is provided based on a diode-OR logical circuit.

As shown in the illustrated example, the positive power input from each of the field power supplies 506, 508 is electrically connected to a field power line 510 on the backplane 300 that interfaces with a pin connector on each of the slots 201-208 (the third through sixth slots 203-206 have been omitted for clarity). Similarly, in the illustrated example, the positive power input from each of the controller power supplies 502, 504 is electrically connected to a controller power line 512 on the backplane 300 that interfaces with a pin connector on each of the slots 201-208. The negative inputs of the controller and power supplies 502, 504, 506, 508 are electrically connected to a common line 514 on the backplane 300 that interfaces with pin connectors on each of the slots 201-208 and is grounded on the rack 200. In the illustrated examples, each of the field power line 510, the controller power line 512, and the common line 514 are associated with the power bus 310 of the backplane 300 illustrated in FIG. 3 that distributes power to the modules installed in the slots 201-208. Further, in some examples, the power bus 310 of the backplane 300 includes a 3.3V backplane line 516 that interfaces with a pin connector on each of the slots 201-208. In addition to the lines 510, 512, 514, 516 associated with the power bus 310, in some examples as shown in the FIG. 5, each power input connector 210 includes a coin cell battery 518 that is electrically connected to a RAM backup line 520 on the backplane 300 that interfaces with another pin connector on each of the slots 201-208.

As shown in the illustrated example, the rack 200 includes a communication line 522 on the backplane 300 that interfaces with multiple different pin connectors on each of the slots 201-208. The communication line 522 is associated with the communication buses 302, 304, 306, 308 of the backplane described above in connection with FIG. 3. In some examples, the communication line 522 includes four ports corresponding to each of the rack-to-rack communication buses (e.g., the I/O bus 304, the ISD bus 306, and the MPT bus 308) as well as the local HSS bus 302. In some examples, the communication line 522 is implemented using RS485/422. In some examples, the communication line 522 is implemented using LVDS.

As shown in FIG. 5, the example rack 200 also includes an interrupt line 524 on the backplane 300 that interfaces with three different pin connectors on each of the slots 201-208. The interrupt line 524 is associated with the interrupt bus 312. In some examples, one pin connector is for the interrupt signal (e.g., generated when a module is inserted or removed from the slot under power), the second pin connector is for a reset signal (e.g., to designate the resetting of configurations when a module is removed), and the third pin connector is for a synchronization signal (e.g., to designate the synchronization of a newly inserted module).

Further still, the example rack 200 shown in the illustrated example of FIG. 5 includes a rack strapping line 526 interfacing with three pin connectors associated with each of the slots 201-208. In some examples, the rack strapping line 526 is representative of the signal paths used to identify the placement of the rack 200 when interconnected in series with other racks. For example, as shown in FIG. 5, the example rack 200 is interconnected at the exit connector 230 with the entry connector 228 of a second rack 528. Thus, the arrangement of the pin connectors and associated signal paths within the rack strapping line 526 serves to identify the relative position of the left rack 200 relative to the right rack 528 in the illustrated example. Additionally, in some examples, each slot 201-208 is associated with three additional pin connectors 530 used for slot strapping to uniquely identify the position or number of each slot within a particular rack. In this manner, the specific location of a module inserted in any slot of any rack can be uniquely identified and, therefore, automatically addressed without manual strapping or configuration. Further detail regarding rack and slot strapping is provided below in connection with FIGS. 10 and 11.

As is shown in the illustrated example, each of the field power line 510, the controller power line 512, the common line 514, the 3.3V backplane line 516, the communication line 522, the interrupt line 524, and the rack strapping line 526 interface with corresponding pin connectors associated with each slot 201-208 and extend through the entry and exit connectors 228, 230 of the rack 200. As a result, when a second rack (e.g., the rack 528 shown in FIG. 5) is communicatively interconnected to the first rack 200 (to form a multi-rack panel), signals transmitted along the lines pass through to all racks (and the associated slots) connected in series. In some examples, the entry connector 228 of the first rack 200 is coupled to a first termination plug 532 while the exit connector 230 of the second rack 528 is coupled to a second termination plug 534. The termination plugs 532, 534 protect the exposed entry and exit connectors 228, 230 at each end of the series of interconnected racks. Furthermore, in some examples, each of the termination plugs 532, 534 includes a resistor 536 (e.g., a 100 ohm resistor) that serves to terminate each end of the communication line 522 extending through the entire panel of multiple racks 200, 528. As noted above, in some examples, only the rack-to-rack communication buses 304, 306, 308 extend through the entry and exit connectors 228, 230. As such, although the communication line 522 is described above as including the local HSS bus 302, the local HSS bus 302 is separately terminated and remains local to each specific rack.

In some examples, the rack 200 includes an intermodule line 538 on the backplane that interfaces three pin connectors of the first slot 201 with three pin connectors of the second slot 202. In the illustrated example, the intermodule line 538 is representative of the communication path for the intermodule link 314 shown in FIG. 3. As shown, unlike the other lines 512, 514, 516, 522, 524, 526 discussed above, the intermodule line 538 does not extend through the entry and exit connectors 228, 230 of the rack 200. Furthermore, a separate intermodule line 538 is provided for each redundant pair of slots. That is, as shown in the illustrated example, the first two slots 201, 202 are communicatively coupled via the backplane 300 over a corresponding intermodule line 538, while the last two slots 207, 208 of the rack 200 are communicatively coupled over a separate corresponding intermodule line 538.

In addition to the communication buses and various signal paths described above in connection with the schematic of FIG. 5, each slot 201-208 includes a module termination connector 540 associated with a corresponding field termination connector 542. In the illustrated example, the module termination connector 540 includes pin connectors corresponding to the terminations 406 of FIG. 4 that are electrically connected via the backplane 300 to pin connectors that interface with a terminal block (e.g., the terminal blocks 211-218 of FIG. 2) coupled to the field termination connector 542. In some examples, each of the module termination connector 540 and the field termination connector 542 include 30 pin connectors in a 3×10 arrangement. In other examples, as shown in FIG. 4, the pin connectors may be arranged in a 2×15 arrangement. A line 544 shown in FIG. 5 represents a one-to-one connection of the corresponding pin connectors on each of the module termination connectors 540 and the field termination connectors 542.

While some of the various communication paths provided via the backplane 300 of the example rack 200 have been shown and described in connection with FIG. 5, different arrangements may alternatively be implemented. For example, a different arrangement of pin connectors and/or the number of pins used may be different than as shown. Thus, while the example arrangement of pin connectors shown in FIG. 4 includes two lines of pin connectors, the example pin connectors in FIG. 5 are arranged in rows of three. Furthermore, while the communication paths are represented in FIG. 5 with individual lines, any of the lines in the illustrated example may represent buses with multiple different signal paths such that FIG. 5 should be understood as a simplification for purposes of explanation.

Figure 6:
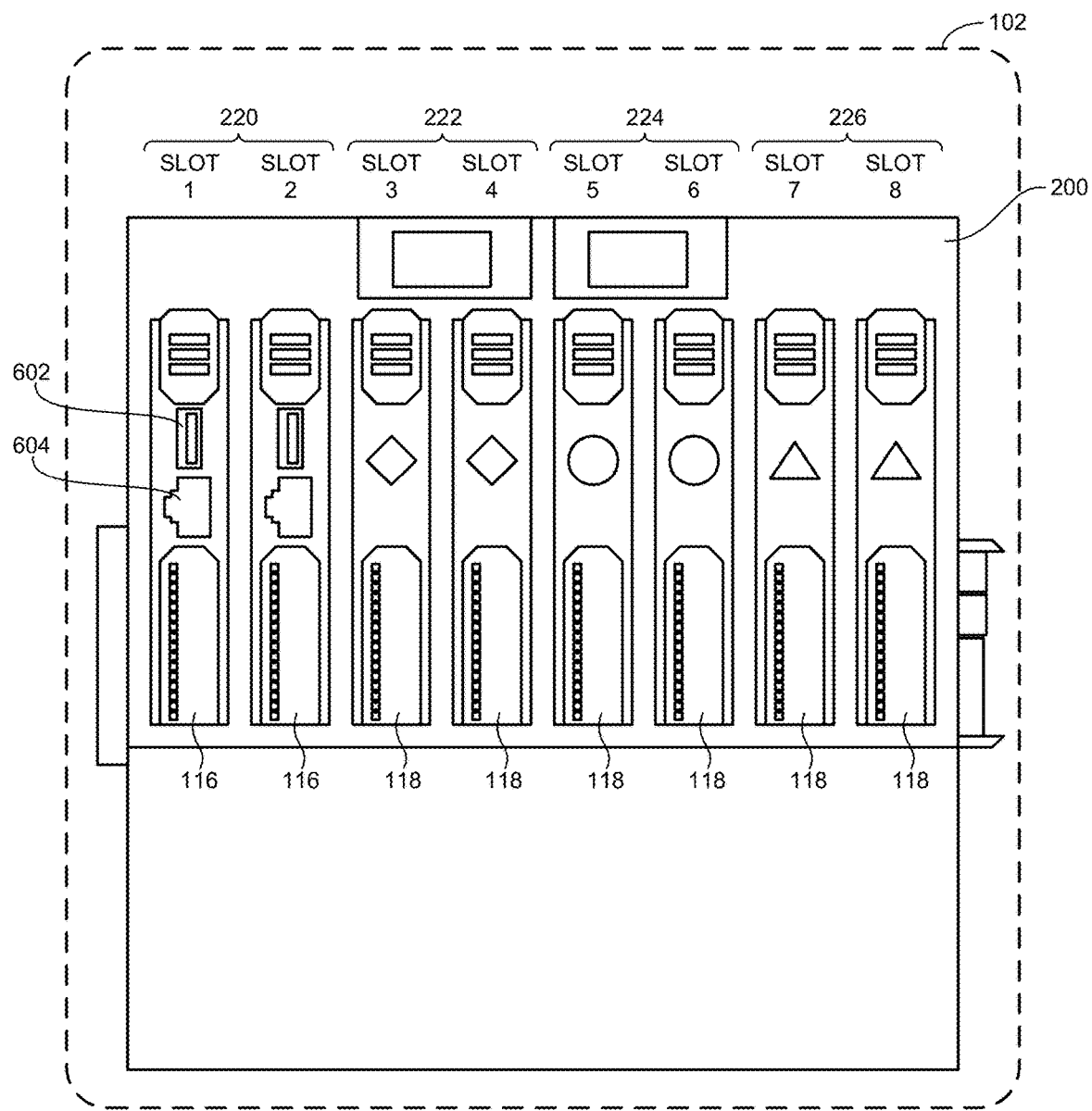
FIG. 6 illustrates an example implementation of the example RTU of FIG. 1 using the example rack of FIG. 2 in a redundant mode.

FIG. 6 illustrates an example implementation of the example RTU 102 of FIG. 1 using a single rack 200 of FIG. 2. In the illustrated example, the termination blocks 211-218 are not shown for the sake of clarity (in some examples, the termination blocks may not be visible because they are under a protective cover). In the illustrated example, the rack 200 is configured in a redundant mode with the same type of modules in each of the redundant pairs 220, 222, 224, 226 of slots. More particularly, the master pair 220 (corresponding to slots 1 and 2) on the rack include CPU modules 116. As described above, in some examples, the CPU module 116 in the first slot is the master CPU module that controls the rack 200. In the illustrated example, the CPU module 116 in the second slot is a backup or secondary CPU module for the master CPU module.

As shown in the illustrated example, the CPU modules 116 include an external USB port 602 and an Ethernet port 604 to enable communications and/or networking with external components and/or other CPU modules in other racks as will be described in greater detail below. In some examples, the CPU modules 116 may have more than one USB port 602 and/or more than one Ethernet port 604. Although not represented in FIG. 6, in some examples, either the I/O modules 118 or the COM modules 120 may also have USB ports and/or Ethernet ports similar to the CPU modules 116. Furthermore, in some examples, any of the modules may have other types of external communications ports, such as, for example, antenna connectors for wireless I/O modules.

The modules in each of slots 3 through 8 of the illustrated example may be any of CPU modules 116, I/O modules 118, or COM modules 120. However, in the illustrated example of FIG. 6, each of the slots 3 through 8 contains an I/O module 118. For purposes of explanation, symbols are shown on the front of each I/O module 118 to indicate different types of modules (e.g., an analog I/O module, a discrete I/O module, a mixed analog/discrete module, a high density discrete input module, a serial I/O module, a RTD module, etc.). As shown in the illustrated example, the same type of module is in both slots corresponding to the same redundant pairs 222, 224, 226 to implement the redundant mode. That is, slots 3 and 4 (the second redundant pair 224) contain the same type of module, which is different than the type of module inserted into slots 5 and 6 (the third redundant pair 224), which is different than the type of module inserted into slots 7 and 8 (the fourth redundant pair 224). As with the CPU modules 116, in some examples, the I/O modules 118 inserted in the odd numbered slots (e.g., slots 3, 5, and 7) are primary modules in redundant mode, whereas the I/O modules 118 inserted in the even numbered slots (e.g., 4, 6, and 8) are secondary modules providing redundant backup to the primary module in the corresponding redundant pairs 222, 224, 226.

Figure 7:
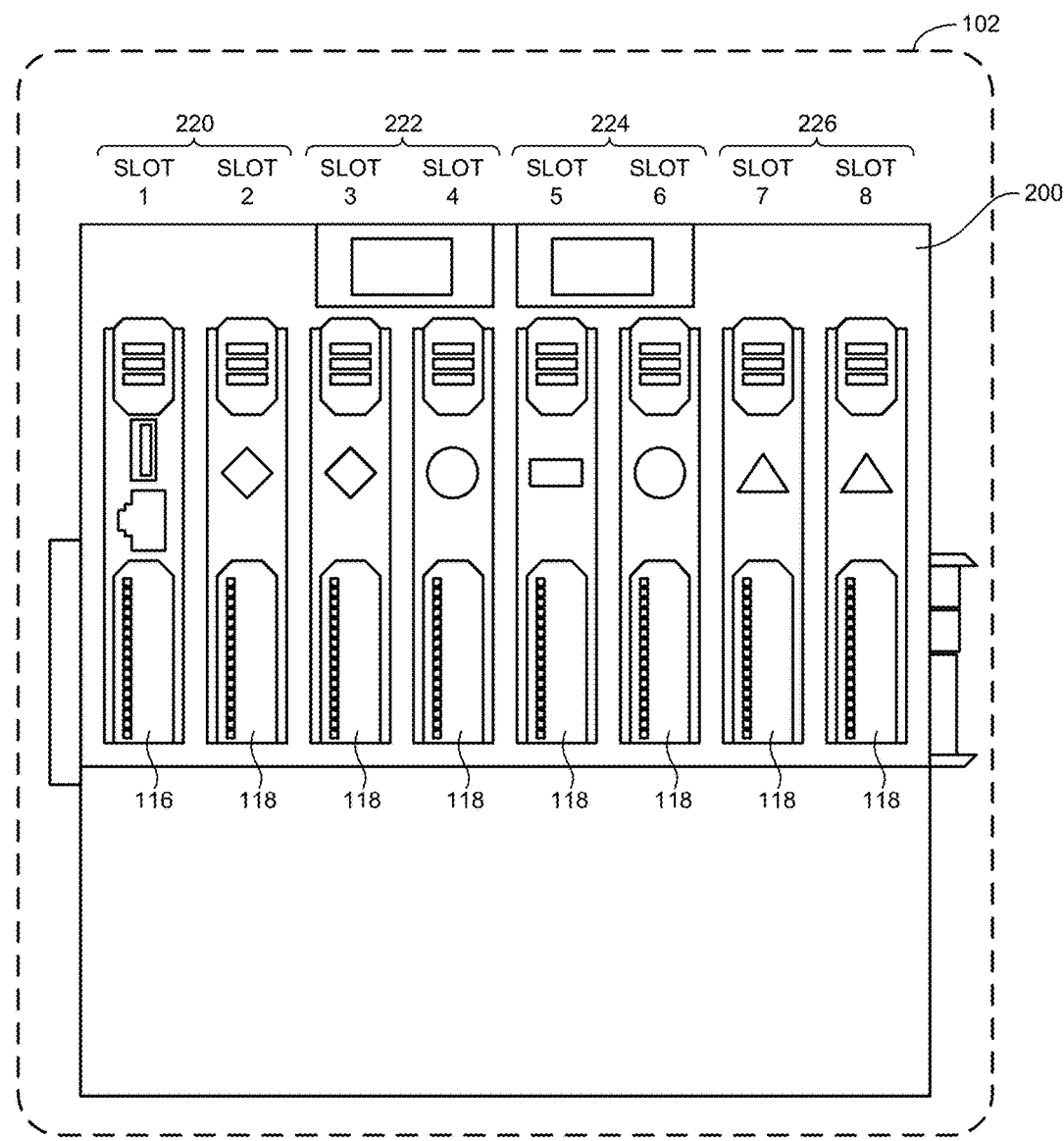
FIG. 7 illustrates another example implementation of the example RTU of FIG. 1 using the example rack of FIG. 2 in a non-redundant mode.

FIG. 7 illustrates another example implementation of the example RTU 102 of FIG. 1 using a single rack 200 of FIG. 2 in a non-redundant mode. Unlike the example implementation illustrated in FIG. 6, the example rack 200 shown in FIG. 7 contains different types of modules inserted within corresponding redundant pairs 220, 222, 224, 226 of the slots. That is, although the module in slot 2 is the same as the module in slot 3, in the illustrated example, they do not provide redundancy because they are inserted in different redundant pairs of slots. Furthermore, although the modules in slots 7 and 8 (corresponding to the fourth redundant pair 226) are the same, in the illustrated example, they are not redundant because they are configured to function separately. That is, even where modules of the same type are inserted into adjacent slots corresponding to a redundant pair, they may only be redundant if configured to operate as such. In some examples, redundancy may be automatically assumed when adjacent slots corresponding to a redundant pair include the same type of module to facilitate efficient configuration of the modules. In some examples, some of the redundant pairs of slots within the rack 200 may be configured to operate in redundant mode while other pairs of slots operate in a non-redundant mode.

Figure 8:
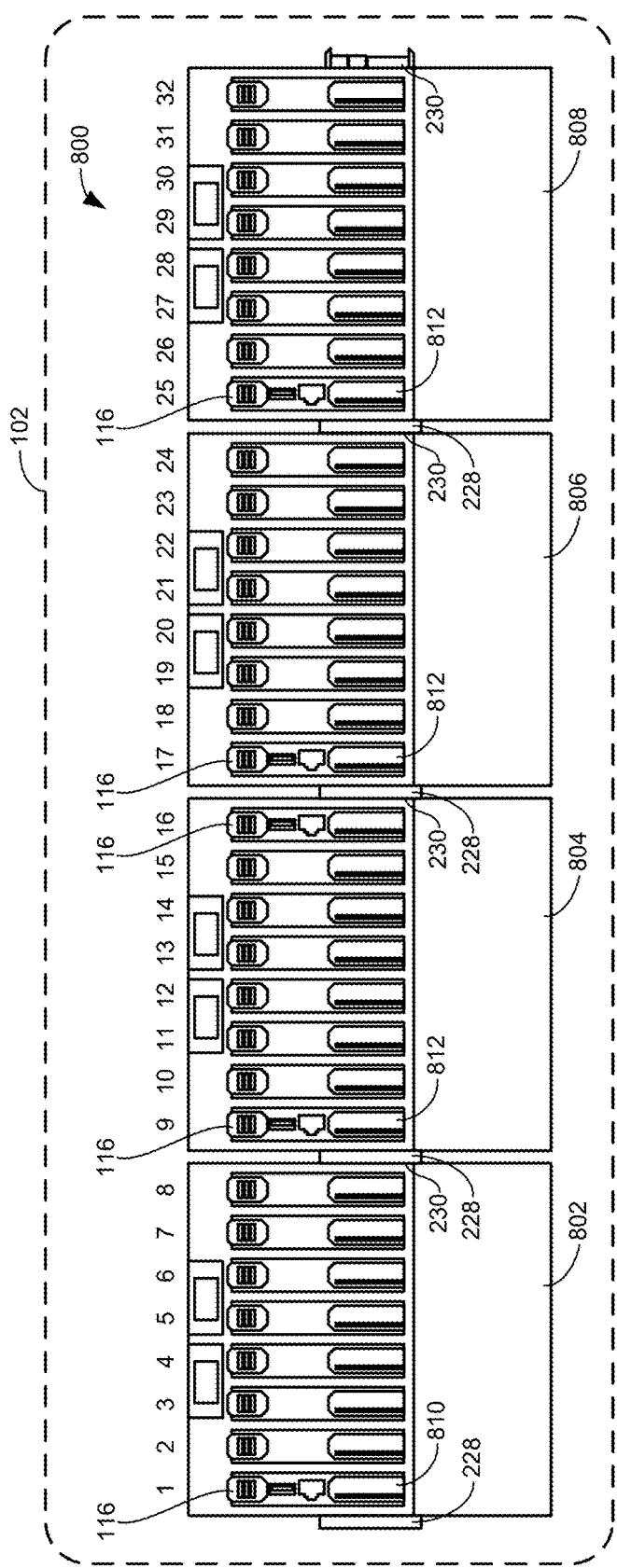
FIG. 8 illustrates another example implementation of the example RTU of FIG. 1 using a panel of multiple racks of FIG. 2.

FIG. 8 illustrates another example implementation of the example RTU 102 of FIG. 1 using a panel 800 of multiple racks 200 described above in connection with FIG. 2. As described above, a panel is used herein to refer to two or more racks 200 communicatively interconnected via the entry and exit connectors 228, 230. The example panel 800 includes a first rack 802, a second rack 804, a third rack 806, and a fourth rack 808. In some examples, a rack that is not connected to any other racks at its entry connector 228 (e.g., the first rack 802 in FIG. 8) is designated herein as the master or base rack for a panel. Any rack that is communicatively interconnected with the exit connector 230 of a base rack is designated herein as an expansion rack. While the example panel 800 is shown oriented horizontally, the panel 800 may be oriented in another direction (e.g., vertically up or vertically down) as desired based on the space available within a field disclosure and/or for any other reason. In some examples, the racks 200 of the panel 800 are mounted in place using DIN rails.

As shown in the illustrated example, a CPU module 116 is inserted in the first slot of each rack 802, 804, 806, 808 corresponding to slots 1, 9, 17, and 25 of the panel 800. An additional CPU module 116 is inserted in slot 16 of the panel 800 (corresponding to slot 8 of the second rack 804). In some examples, the CPU module 116 in slot 1 of the base rack 802 is automatically designated as a master CPU module 810 for the entire panel 800. As a result, in the illustrated example of FIG. 8, all of the other CPU modules 116 (in slots 9, 16, 17, and 25 of the panel 800) are CPU I/O modules 812 that function as slaves to the master CPU module 810 in the first (base or master) rack 802. However, the master CPU module 810 on the first rack 802 of the panel 800 does not have direct access to the local HSS bus 302 on the expansion racks 804, 806, 808 and, thus, cannot control local (rack specific) communications over the local HSS bus 302. Accordingly, in some examples, while the CPU I/O modules 812 in slots 9, 17, and 25 of the panel 800 are slaves to the master CPU module in slot 1 of the panel 800 with respect to the rack-to-rack communication buses (the I/O bus 304, the ISD bus 306, and the MPT bus 308), the CPU I/O modules 812 in slots 9, 17, and 25 nevertheless function as the master with respect to the local HSS bus 302 on the corresponding expansion racks 804, 806, 808. The use of CPU I/O modules in this capacity enables direct high speed communication to each module on the corresponding rack including, for example, the transfer of I/O variables for local use on the rack without limiting the high speed updates of dynamic variables through the I/O bus 304 (controlled by the master CPU module 810 in the first rack) that spans the entire panel 800. By contrast, the CPU I/O module 812 installed in slot 16 of the panel 800 (slot 8 of the second rack 804) is a slave to the master CPU module 812 in the first rack 802 with respect to the rack-to-rack communication buses and a slave to the CPU I/O module 812 installed in slot 9 of the panel 800 with respect to the local HSS bus 304 on the second rack 802 of the panel 800.

Using CPU I/O modules 812 in addition to the master CPU module 810 on a panel, as shown in the illustrated example of FIG. 8, can significantly increase the computing power of the panel. Additionally, in some examples, CPU I/O modules may be used to provide a fast logging function without burdening the master CPU module. For example, the CPU I/O modules may monitor the I/O bus 304 for data and fast log any I/O data point in the control system independent of the master CPU module. Further, such logged data may be retrieved using the Ethernet port 604 onboard the CPU I/O module 812 so as not to affect the main system performance.

Another advantage of using CPU I/O modules 812 is the implementation of distributed databases. In some examples, the database of CPU I/O modules 812 may be synchronized and read using the rack-to-rack communication buses to enable a much larger database than would be possible with only a single CPU module 116 (i.e., a master CPU module 810). In some such examples, the ISD bus 306 is used to synchronize the database and the MPT bus 308 is used to read the database from a host (e.g., the system host 110 of FIG. 1).

Figure 9:
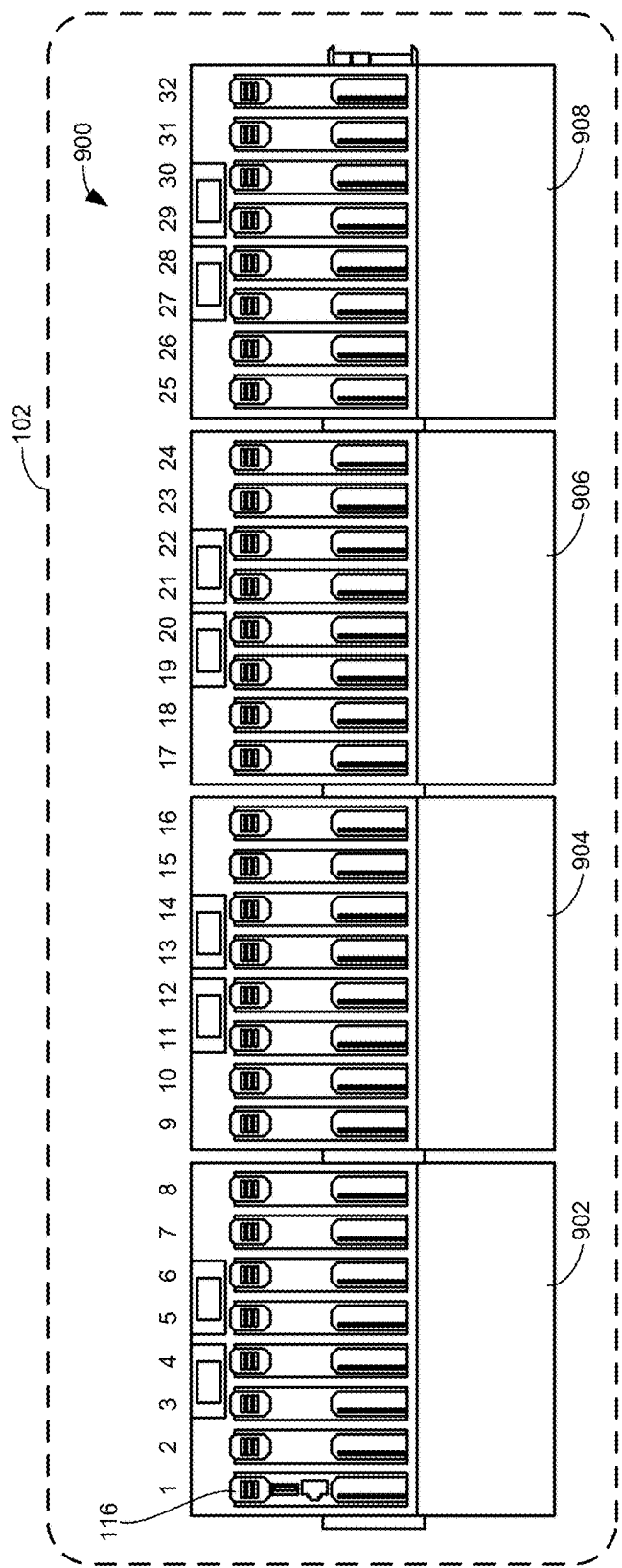
FIG. 9 illustrates another example implementation of the example RTU of FIG. 1 using a panel of multiple racks of FIG. 2.

FIG. 9 illustrates another example implementation of the example RTU 102 of FIG. 1 using a panel 900 of four racks communicatively interconnected in series. The four racks include a base rack 902 and three expansion racks 904, 906, 908. The example panel 900 of FIG. 11 includes a single CPU module 116 in slot 1 of the panel that functions as the master CPU module for the entire panel. In the illustrated example, the slots 2 through 32 of the panel include I/O modules 118 and/or COM modules 120 in slots. Unlike the example panel 800 of FIG. 8, the example panel 900 of FIG. 9 does not include a CPU module in the expansion racks 904, 906, 908. As such, while the CPU module 116 in slot 1 of the panel serves as the master for the rack-to-rack communication buses that extend through the entire panel, there is no master (e.g., there is no control) for the local HSS bus 302 on the expansion racks 904, 906, 908.

One reason for using multiple racks 200 to form a panel, as shown in FIGS. 8 and 9, is to enable I/O expansion. For instance, in the illustrated example of FIG. 9, the panel 900 includes space for 32 modules (based on having four racks 902, 904, 906, 908). Assuming a maximum of 16 I/O points per I/O module and 31 I/O modules installed on the panel 900 (and one CPU module 116), the maximum I/O count for the panel 900 illustrated in FIG. 9 is 496. Greater I/O expansion may be possible if additional racks 200 are interconnected in series. However, there may be practical upper limits on the number of racks 200 that may be interconnected such as, for example, spatial constraints within a field enclosure, processing capacity of the master CPU module, desired I/O scanning rate, etc.

Figures 10, 11:
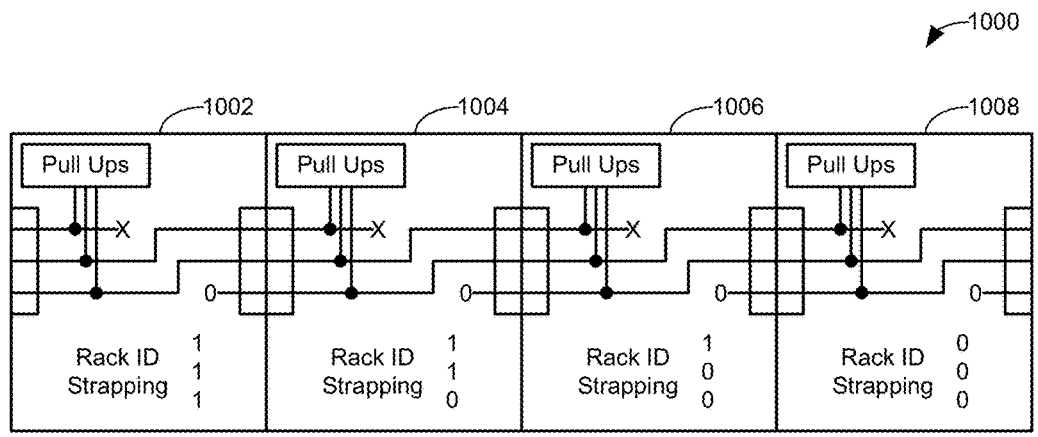
FIG. 10 illustrates an example strapping scheme to uniquely identify the placement of each rack in a multi-rack panel.
FIG. 11 is a table illustrating the strapping outputs for each slot in the example rack of FIG. 2 to uniquely identify the position of each slot within the rack.

In some examples, four racks is established as an upper limit for a single panel due to rack strapping built into the backplane of each rack, whereby modules inserted into the slots of a particular rack may automatically identify the placement of the rack within the panel (e.g., whether the rack is a base rack or an expansion rack). FIG. 10 illustrates an example strapping scheme for a panel 1000 of four racks 1002, 1004, 1006, 1008 communicatively interconnected in series to identify the placement of each rack in the multi-rack panel. In the illustrated example, each rack uses three signals and a fixed ground to identify its placement within the panel. More particularly, as shown in the illustrated example of FIG. 10, each of the four racks 1002, 1004, 1006, 1008 includes a three-line cascading signal that passes from rack to rack in a manner such that the rack ID strapping is a different three-bit coded binary address for each rack. As shown, the first (master) rack 1002 has a binary rack ID strapping of 1-1-1 (decimal value address of 7), the second rack 1004 has a binary rack ID strapping of 1-1-0 (decimal value address of 6), the third rack 1006 has a binary rack ID strapping of 1-0-0 (decimal value address of 4), and the fourth rack 1008 has a rack ID strapping of 0-0-0 (decimal value address of 0). In this manner, each rack, and its associated placement within the panel relative to the other racks, can be uniquely and automatically identified. In examples where more than four racks are to be interconnected, each of the racks may use additional signals on additional lines following the example scheme shown in FIG. 10. More generally, to enable this automatic rack identification scheme, the total number of racks that may be interconnected is one greater than the total number of rack strapping signals built into the backplane of each rack.

In addition to rack strapping, in some examples, each slot on the backplane of each rack contains strapping to identify the particular slot to a module inserted therein. More particularly, in some examples, the backplane for each slot includes three lines that are either grounded or pulled to positive to define eight unique 3-bit strapping output values as illustrated in the table of FIG. 11. As shown in the illustrated table, slot 1 (the master slot) contains three lines that are grounded (0-0-0) giving the slot a decimal address value of 0, for slot 2 the first two lines are grounded and the third line is pulled to positive (0-0-1) giving the slot a decimal address value of 1, and so forth. In some examples, when a module is plugged into a slot, the module reads the slot strapping to automatically determine what slot the module is plugged into.

In some examples, the rack strapping and slot strapping are used in combination to automatically define the address for each module in a panel containing multiple racks. In this manner, a CPU module 116 inserted into any slot can automatically determine whether it is to function as the master CPU module (when installed in slot 1 of the first rack) and when it is to function as an I/O module (when installed in any rack other than the base rack or in any slot other than the first slot of the base rack). Furthermore, the master CPU module may use this addressing scheme in controlling communications over the communication buses of the backplane 300 to each specific module. Further still, in some examples, the master CPU module cycles through each address (each slot of each rack) to identify the modules installed in each slot.

Figure 12:
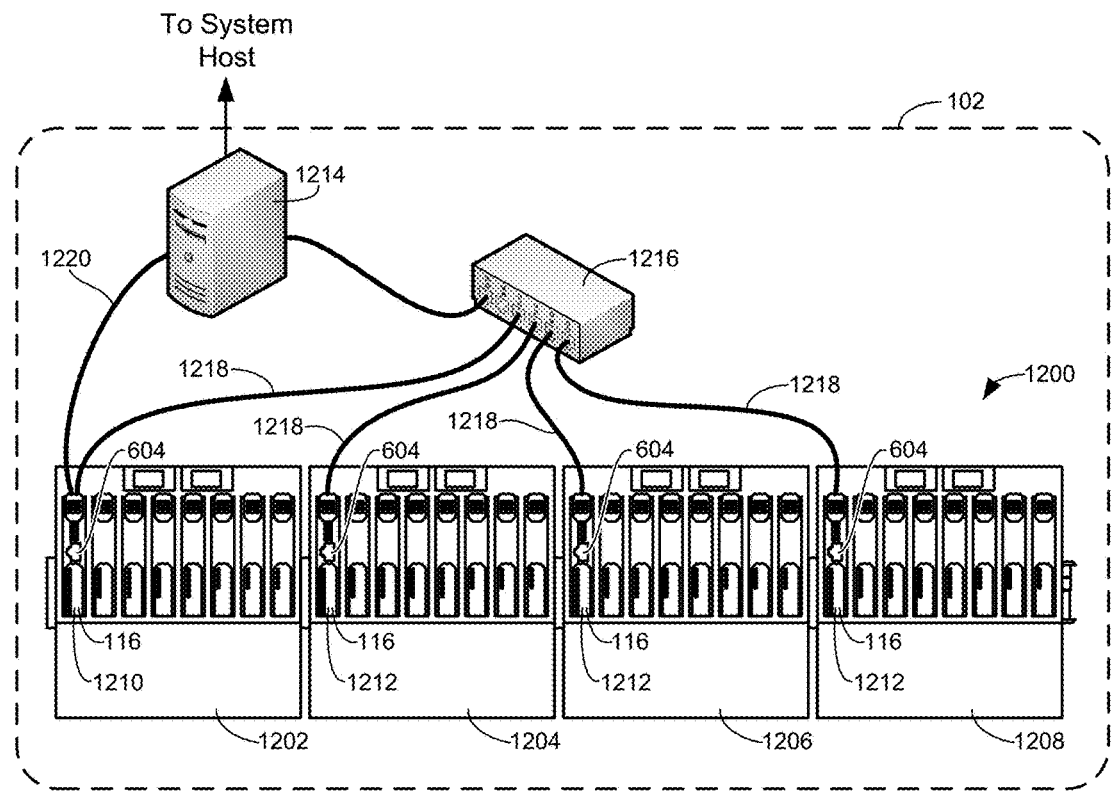
FIG. 12 illustrates another example implementation of the example RTU of FIG. 1 using a panel of multiple racks of FIG. 2 communicatively interconnected using Ethernet.

FIG. 12 illustrates another example implementation of the example RTU 102 of FIG. 1 with an Ethernet connected panel 1200 of four racks 1202, 1204, 1206, 1208. The example panel 1200 is similar to the example panel 800 of FIG. 8 with a CPU module 116 inserted in the first slot of each rack 1202, 1204, 1206, 1208 with the first CPU module 116 designated as a master CPU module 1210 and the other CPU modules 116 operating as CPU I/O modules 1212. However, the panel 1200 of FIG. 12 is different than the example panel 800 of FIG. 8 because the CPU modules are communicatively coupled to an external Ethernet network. In some examples, as shown in FIG. 12, each of the CPU modules 116 in each rack 1202, 1204, 1206, 1208 is communicatively coupled to a network server 1214 via a hub 1216. In some examples, as shown in FIG. 12, the network server 1214 is local to the RTU 102. In other examples, the network server 1214 may be remote from the RTU (e.g., located and/or associated with the system host 110 of FIG. 1). In some examples, such networking employs Ethernet cables 1218 that extend between the hub 1216 and the Ethernet port 604 provided on each CPU module 116 coupled to the network. Thus, in some examples, the CPU modules 116 may communicate along the rack-to-rack communication buses as described above or independent of such buses over the Ethernet network. The implementation of an external Ethernet network in this manner allows for very high speed syncing of databases and also enables remote access directly to each CPU module 116 in the system (e.g., without having to go through the master CPU module 1210 in the first rack 1202).

Additionally or alternatively, in some examples, the master CPU module 1210 in the first rack 1202 may be directly coupled to the network server 1214 (e.g., via an Ethernet cable 1220) to provide a direct link between the panel 1200 and the server 1214. In this manner, the multiple racks 1202, 1204, 1206, 1208, each with a corresponding CPU module 116, may be treated as a single system (e.g., have a single IP address) from the perspective of the server 1214. Thus, in some examples, the Ethernet network server 1214 may serve as a gateway to isolate the IP network that goes to the system host 110 from a separate field IP network that goes to the field. In other words, this implementation allows for Ethernet subnetworks and can improve IT security by isolating separate networks.

Figure 13:
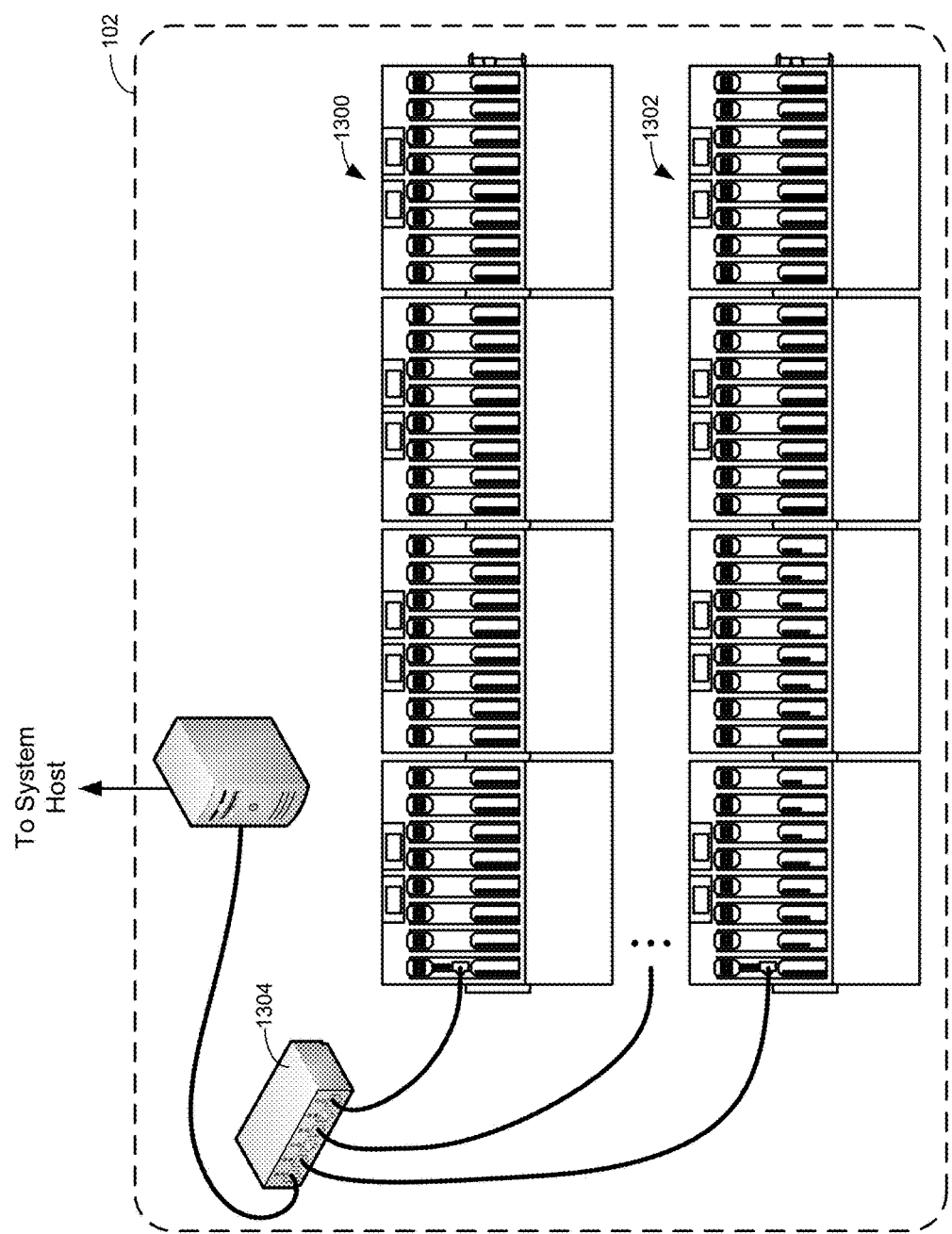
FIG. 13 illustrates another example implementation of the example RTU of FIG. 1 using multiple panels of multiple racks of FIG. 2 communicatively interconnected using Ethernet.

As noted above, multiple racks may be interconnected to form a single panel to expand the number of available I/O ports. In some examples, where even greater I/O expansion and/or where remote mounting of large I/O blocks is desired, multiple panels (each with multiple racks) may be communicatively coupled via Ethernet as illustrated in FIG. 13. In particular, FIG. 13 illustrates another example implementation of the example RTU 102 of FIG. 1 using multiple different panels 1300, 1302 interconnected via an Ethernet network hub 1304. That is, while the different panels 1300, 1302 are physically decoupled (e.g., the entry and exit connectors are not interconnected), communications between the modules in each panel is achieved through the Ethernet network. While only two panels 1300, 1302 are shown in the illustrated example, more panels may be communicatively coupled in like manner. The maximum number of panels may be limited by practical considerations and design constraints such as database size, the allowance of distributed databases, update rates between panels, system addressing, etc. In some examples, data access for the multi-panel RTU is accomplished through a centralized database. In other examples, data access is provided via Ethernet access to a distributed database. In either approach, the result is that all data in the multi-panel system is accessible by any application residing on any module on the multi-panel system.

Figure 14:
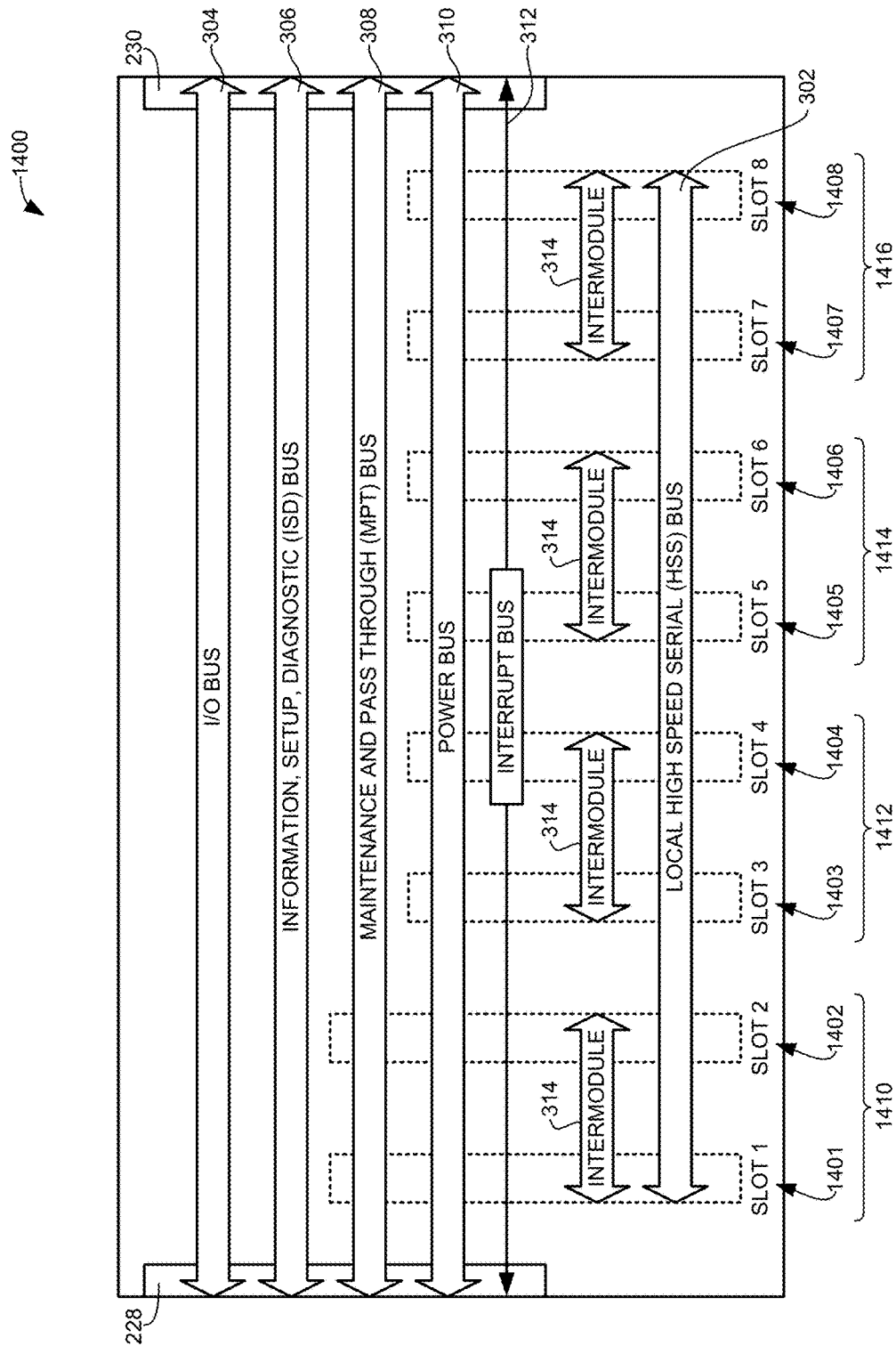
FIG. 14 illustrates a schematic of another example backplane for the example rack of FIG. 2.

FIG. 14 illustrates another example backplane 1400 for the example rack 200 of FIG. 2. In the illustrated example of FIG. 14, the backplane 1400 is similar to the backplane 300 of FIG. 3 to communicatively interconnect eight slots 1401, 1402, 1403, 1404, 1405, 1406, 1407, 1408 via a local HSS bus 302. Further, as shown in the illustrated example, the backplane 1400 enables module-to-module communications between redundant modules installed in redundant pairs 1410, 1412, 1414, 1416 of slots through an intermodule link 314. Additionally, as with the backplane 300 of FIG. 3, the example backplane 1400 of FIG. 14 is provided with similar rack-to-rack communication buses (including the I/O bus 304, the ISD bus 306, and the MPT bus 308), a power bus 310, and an interrupt bus 312.

However, unlike the example backplane 300 of FIG. 3, as shown in the illustrated example, the rack-to-rack communication buses 304, 306, 308 of the backplane 1400 of FIG. 14 pass through the backplane 1400 between the entry connector 228 and the exit connector 230 without connecting to the slots unassociated with the master pair 1410 associated with the first two slots 1401, 1402. Furthermore, as shown in the illustrated example, among the rack-to-rack communication buses, only the MPT bus 308 is communicatively coupled to the slots 1401, 1402 of the master pair 1410. In this manner, a rack 200 with the example backplane 1400 of FIG. 14 may be interconnected with other racks 200 having the backplane 300 of FIG. 3 to form a panel that provides a consistent bus structure across the multiple racks while isolating the modules inserted in the slots 1401-1408 of the rack with the backplane 1400 as shown in FIG. 14. As a result, it is possible to create an isolated system within a system. One application of this configuration is to enable the establishment of a safety integrity system (SIL) without having the entire, higher-level system SIL rated. In the illustrated example, the only link to the rack-to-rack communications provided for the higher-level system is through the CPU module inserted in the master slot 1401 (or redundant master slot 1402) communicating over the MPT bus 308. Although the power bus 310 is shown extending through the entry and exit connectors 228, 230 in FIG. 14 to carry power through the rack 200 and to each of the slots 1401-1408, in other examples, the slots 1401-1408 are in communication with a separate power bus that is isolated to the specific rack 1400 to provide independent power to modules inserted therein.

From the foregoing, it will be appreciated that the above disclosed methods, apparatus and articles of manufacture provide a single backplane/rack design that may be communicatively interconnected with similar racks to create a multi-rack panel, thereby reducing the number of parts needed and the number of spares required. Further, each of the module slots in the rack and its connection to the backplane is identical with every other slot such that different modules (with different functionality) may be inserted in any slot. The slot position defines whether the slot is a master or slave on a local bus and whether an associated module is a primary module (defaulted to active) or a secondary module (defaulted to standby) in a redundant pair. Furthermore, slot strapping enables the automatic identification of the position of each slot into which a module is inserted. Further still, the slot strapping may be used in conjunction with rack strapping to enable the automatic addressing of modules in a panel (of multiple racks) without the need for a user to set jumpers or switches.

Additionally, the example backplane/rack design disclosed herein provides multiple high speed buses to separate I/O communications, diagnostic and/or configuration communications, and maintenance function communications. This approach increases the deterministic transfer of I/O variables by eliminating interruptions to such communications from maintenance and diagnostic transactions. That is, diagnostic and/or configuration communications (e.g., diagnostics of smart field devices (such as HART devices) and change/update/log configuration variables) can be detailed using queries without affecting I/O bus rates because they are implemented on a separate bus. Similarly, firmware updates can be achieved without disturbing I/O scanning because such updates are implemented on a separate bus to the I/O updates.

Furthermore, the ability to add expansion racks to a base racks that supports multiple separate CPU modules enables increased processing power. This increased processing capacity allows for increased data logging and analysis (including pattern recognition and deviations) along with the capability to generate and transfer standard file types (e.g., JPEG) for the generation of high level optimization applications either at the RTU level or the SCADA level.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a first central processing unit module to be in communication with a host of a process control system; and
   a first rack including a backplane and a plurality of slots, the plurality of slots including a master slot to receive the first central processing unit module, the backplane to communicatively couple the first central processing unit module to at least one of a first communication module or a first input/output (I/O) module inserted in a second one of the slots, the backplane including a first communication bus for communication of I/O data and a second communication bus for communication of at least one of maintenance data, pass-through data, product information data, archival data, diagnostic data, or setup data, the first communication bus to be independent of the second communication bus, the first rack including a first power connector and a second power connector, the first and second power connectors to be electrically coupled to the backplane using a diode-OR logical circuit implementation.

2. The apparatus of claim 1, wherein the first communication bus is to be exclusively dedicated for communication of the I/O data.

3. The apparatus of claim 1, wherein the backplane includes a third communication bus independent of the first and second communication buses, the second communication bus for communication of at least one of the maintenance data or the pass-through data, the third communication bus for communication of at least one of the product information data, the archival data, the diagnostic data, or the setup data.

4. The apparatus of claim 1, wherein the first communication bus is to be used for communications of the at least one of the maintenance data, the pass-through data, the product information data, the archival data, the diagnostic data, or the setup data when the second communication bus fails, and the second communication bus is to be used for communication of the I/O data when the first communication bus fails.

5. The apparatus of claim 1, wherein the slots are arranged in redundant pairs including a primary slot and a secondary slot, communications with a first module in the primary slot of a first redundant pair of slots are to failover to a second module in the secondary slot of the first redundant pair of slots when the first module is a same type of module as the second module.

6. The apparatus of claim 5, wherein separate communications are to be implemented with each of the first and second modules when the second module is at least one of a different type of module than the second module or configured to operate in a non-redundant mode with the first module.

7. An apparatus comprising:
a first central processing unit module to be in communication with a host of a process control system; and
a first rack including a backplane and a plurality of slots, the plurality of slots including a master slot to receive the first central processing unit module, the backplane to communicatively couple the first central processing unit module to at least one of a first communication module or a first input/output (I/O) module inserted in a second one of the slots, the backplane including a first communication bus for communication of I/O data and a second communication bus for communication of at least one of maintenance data, pass-through data, product information data, archival data, diagnostic data, or setup data, the first communication bus to be independent of the second communication bus, wherein the first rack includes an entry connector and an exit connector, the exit connector of the first rack to communicatively couple with a second entry connector of a second rack to place the first and second communication buses of the first rack in communication with the first and second communication buses of the second rack.

8. The apparatus of claim 7, wherein the first and second racks include cascading pin connectors to automatically identify a rack placement of each of the first and second racks, each of the slots in the first and second racks including strapping to automatically designate a slot position on each of the first and second racks, an address for a module installed in one of the first or second racks to be automatically assigned based on the corresponding rack placement and slot position.

9. The apparatus of claim 7, wherein the master slot of the second rack is to receive at least one of a second communication module or a second I/O module, the first central processing unit module on the first rack to control the at least one of the second communication module or the second I/O module on the second rack.

10. The apparatus of claim 7, wherein the master slot of the second rack is to receive a second central processing unit module, the second central processing unit module to be prevented from controlling communications over the first and second communication buses of the first and second racks.

11. The apparatus of claim 10, wherein a first local communications bus on the backplane of the first rack is independent of a second local communications bus on the backplane of the second rack, the first central processing unit module to control communications over the first local communications bus of the first rack, the second central processing unit module to control communications over the second local communications bus of the second rack.

12. The apparatus of claim 10, wherein the first and second central processing unit modules are communicatively coupled via an Ethernet network external to the first and second racks.

13. The apparatus of claim 7, wherein the first central processing unit module is to be communicatively coupled to a second central processing unit module in the second rack via an Ethernet network, the second rack to be physically decoupled from the first rack.

14. The apparatus of claim 7, wherein the first communication bus on the second rack passes through the second rack without connecting to at least some of the slots on the second rack.

15. A chassis for a remote terminal unit comprising:
a backplane;
a plurality of slots to receive modules corresponding to at least one of a central processing unit module, a communication module, or an input/output (I/O) module;
a first communication bus on the backplane to communicatively couple different ones of the modules inserted in different ones of the slots, the first communication bus for communication of I/O data;
a second communication bus on the backplane to communicatively couple different ones of the modules inserted in different ones of the slots independent of the first communication bus, the second communication bus for communication of at least one of maintenance data, pass-through data, product information data, archival data, diagnostic data, or setup data;
an entry connector; and
an exit connector, the exit connector to communicatively interconnect with a second entry connector of a second chassis, the first and second communication buses to extend through the first and second chassis via the exit connector of the first chassis and the second entry connector of the second chassis.

16. The chassis of claim 15, wherein the plurality of slots includes a master slot to receive a master central processing unit module, the master central processing unit module to control communications over the first and second communication buses and to be in communication with a host of a process control system.

17. The chassis of claim 15, further including an intermodule link on the backplane between redundant pairs of the slots to enable module-to-module communications between two of the modules inserted into two of the slots associated with a first redundant pair, the two modules including a primary module to be in an active state and a secondary module to be in a standby state.

18. A rack for a remote terminal unit comprising:
a backplane;
a first slot communicatively coupled to the backplane to receive a first module;
a second slot communicatively coupled to the backplane to receive a second module;
a third slot communicatively coupled to the backplane to receive a third module;
a fourth slot communicatively coupled to the backplane to receive a fourth module;
a first communication bus on the backplane to communicatively couple the first, second, third, and fourth modules when inserted in the respective first, second, third, and fourth slots, the first communication bus to be implemented for communication of I/O data;
a second communication bus on the backplane to communicatively couple the first, second, third, and fourth modules independent of the first communication bus, the second communication bus to be implemented for communication of additional data other than the I/O data;
a first intermodule link on the backplane to enable communications between the first and second modules when the first and second modules are inserted in the respective first and second slots; and
a second intermodule link, different from the first intermodule link, on the backplane to enable communications between the third and fourth modules when the third and fourth modules are inserted in the respective third and fourth slots, the first and second intermodule links being separate from the first and second communication buses.

19. The rack of claim 18, further including a rack-to-rack connector to interconnect the rack to a second rack, the rack-to-rack connector to communicatively interconnect the first and second communication buses on the backplane with corresponding buses on a second backplane of the second rack.

20. The rack of claim 19, wherein the first module corresponds to a master central processing unit module for the remote terminal unit, and the master central processing unit module controls communications over the first and second communication buses with a fifth module inserted in a fifth slot in the second rack.

* * * * *